United States Patent
Chen et al.

(10) Patent No.: US 11,523,656 B2
(45) Date of Patent: Dec. 13, 2022

(54) SOLE STRUCTURE WITH PROPRIOCEPTIVE ELEMENTS AND METHOD OF MANUFACTURING A SOLE STRUCTURE

(71) Applicant: NIKE, Inc., Beaverton, OR (US)

(72) Inventors: Yuchung K. Chen, Portland, OR (US); Oliver McLachlan, Beaverton, OR (US); Thomas J. Rushbrook, Portland, OR (US); Timothy J. Smith, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 70 days.

(21) Appl. No.: 17/015,699

(22) Filed: Sep. 9, 2020

(65) Prior Publication Data
US 2020/0405007 A1  Dec. 31, 2020

Related U.S. Application Data

(62) Division of application No. 15/958,120, filed on Apr. 20, 2018, now Pat. No. 10,798,993.
(Continued)

(51) Int. Cl.
*A43B 13/12* (2006.01)
*A43B 13/18* (2006.01)
(Continued)

(52) U.S. Cl.
CPC .............. *A43B 13/127* (2013.01); *A43B 7/24* (2013.01); *A43B 13/12* (2013.01); *A43B 13/141* (2013.01);
(Continued)

(58) Field of Classification Search
CPC ..... A43B 13/127; A43B 13/12; A43B 13/141; A43B 13/187; A43B 13/188;
(Continued)

(56) References Cited

U.S. PATENT DOCUMENTS

| 511,942 A | * | 1/1894 | Glanville | ............... A43B 17/00 36/43 |
| 1,675,865 A | * | 7/1928 | Pfestroff | .............. A43B 13/141 12/146 B |

(Continued)

FOREIGN PATENT DOCUMENTS

| CN | 101287427 A | 10/2008 | |
| DE | 3741444 A1 * | 7/1988 | ............. A43B 13/14 |

(Continued)

OTHER PUBLICATIONS

"What Is the Difference Between Open-Cell and Close-Cell Polyurethane Foams." Foam-Tech, Apr. 10, 2016, https://web.archive.org/web/20160410144010/http://www.foam-tech.com:80/products/urethane_foam/open_closed_cell.htm. (Year: 2016).*

*Primary Examiner* — Sharon M Prange
*Assistant Examiner* — Grace Huang
(74) *Attorney, Agent, or Firm* — Quinn IP Law

(57) ABSTRACT

A sole structure for an article of footwear comprises a midsole body having a proximal surface and a distal surface. Proprioceptive elements may extend in the hole in the midsole body, and translate toward the proximal surface in the holes upon a force directed along a central axis of the hole at a distal end of the proprioceptive elements. In various embodiments, the holes may angle relative to vertical from the proximal surface to the distal surface, the holes may be defined by perforations and the proprioceptive elements may be integral portions of the midsole body, or the midsole body may have a plurality of annular holes at the proximal surface, and a plurality of annular recesses in the distal surface, and a plurality of proprioceptive elements, each centered in a different annular hole of the plurality of annular holes. Methods of manufacturing articles of footwear are described.

18 Claims, 33 Drawing Sheets

Related U.S. Application Data

(60) Provisional application No. 62/488,512, filed on Apr. 21, 2017.

(51) Int. Cl.
*A43B 13/14* (2006.01)
*A43B 7/24* (2006.01)

(52) U.S. Cl.
CPC .......... *A43B 13/187* (2013.01); *A43B 13/188* (2013.01); *B32B 2437/02* (2013.01)

(58) Field of Classification Search
CPC ..... A43B 13/122; A43B 13/125; A43B 13/14; A43B 7/24; A43B 7/1485; A43B 7/00; A43B 3/248
USPC ........................................... 36/25 R, 102, 28
See application file for complete search history.

(56) References Cited

U.S. PATENT DOCUMENTS

| | | | | |
|---|---|---|---|---|
| 5,024,007 A * | 6/1991 | DuFour | .................. | A43B 13/24 36/31 |
| 5,067,259 A * | 11/1991 | Fruge | ...................... | A43B 5/02 36/102 |
| 5,142,797 A * | 9/1992 | Cole, III | .............. | A43B 13/181 36/102 |
| 5,595,003 A * | 1/1997 | Snow | .................. | A43B 13/181 36/31 |
| 5,682,690 A * | 11/1997 | Chang | .................. | A43B 13/182 601/134 |
| 5,768,802 A | 6/1998 | Bramani | | |
| 5,768,806 A * | 6/1998 | Parisotto | ................ | A43B 21/26 36/102 |
| 5,784,808 A * | 7/1998 | Hockerson | ........... | A43B 13/181 36/102 |
| 6,428,865 B1 | 8/2002 | Huang | | |
| 8,181,364 B2 * | 5/2012 | Mayden | ................. | A43B 13/26 36/35 R |
| 8,266,825 B2 * | 9/2012 | Pfister | .................... | A43B 21/26 36/28 |
| 8,510,975 B2 * | 8/2013 | Krikelis | ................. | A43B 19/00 36/102 |
| 8,713,819 B2 * | 5/2014 | Auger | ...................... | A43B 5/02 36/76 R |
| 8,763,275 B2 * | 7/2014 | Shalom | .................. | A43B 3/246 36/102 |
| 9,003,678 B2 * | 4/2015 | Wan | ...................... | A43B 13/141 36/25 R |
| 9,554,624 B2 * | 1/2017 | Cross | ................... | A43B 13/141 |
| 9,974,356 B2 * | 5/2018 | Foxen | .................. | A43B 7/1405 |
| 10,231,514 B2 * | 3/2019 | Armon | ................. | A43B 13/141 |
| 10,588,379 B2 * | 3/2020 | Sussmann | ........... | A43B 3/0047 |
| 10,602,802 B2 * | 3/2020 | Hopkins | ................ | A43B 11/00 |
| 10,750,817 B2 * | 8/2020 | Barnes | ................. | A43B 13/026 |
| 11,058,169 B2 * | 7/2021 | Comstock | ............ | A43B 17/02 |
| 2002/0007571 A1 * | 1/2002 | Ellis, III | .............. | A43B 13/143 36/102 |
| 2004/0023139 A1 | 2/2004 | Yoshimura et al. | | |
| 2005/0166422 A1 * | 8/2005 | Schaeffer | ............. | A43B 13/141 36/27 |
| 2006/0143945 A1 * | 7/2006 | Walker | ................. | A43B 13/141 36/8.3 |
| 2006/0143950 A1 * | 7/2006 | Beak | ...................... | A43B 13/04 36/97 |
| 2011/0209359 A1 * | 9/2011 | Chen | ...................... | A43B 17/04 36/43 |
| 2011/0232130 A1 * | 9/2011 | Boudreau | ........... | A43B 13/181 36/103 |
| 2014/0202031 A1 * | 7/2014 | Seo | ...................... | A43B 13/181 36/28 |
| 2015/0196087 A1 * | 7/2015 | Meschter | ............. | A43C 15/168 36/25 R |
| 2016/0183632 A1 * | 6/2016 | Scofield | ............... | A43B 13/187 36/28 |
| 2017/0332729 A1 * | 11/2017 | Milianti | ................. | A43B 3/128 |
| 2017/0340058 A1 * | 11/2017 | Madore | ................. | A43B 13/04 |
| 2017/0367438 A1 * | 12/2017 | Del Biondi | .......... | A43B 13/223 |

FOREIGN PATENT DOCUMENTS

| | | | | |
|---|---|---|---|---|
| EP | 0702907 A1 | 3/1996 | | |
| FR | 2863458 A1 | 6/2005 | | |
| FR | 3065152 A1 * | 10/2018 | .......... | A43B 13/141 |
| WO | WO-9105491 A1 * | 5/1991 | ............ | A43B 13/14 |
| WO | 2008115743 A1 | 9/2008 | | |
| WO | WO-2014068128 A1 * | 5/2014 | .......... | A43B 13/026 |
| WO | 2016191105 A1 | 12/2016 | | |

* cited by examiner

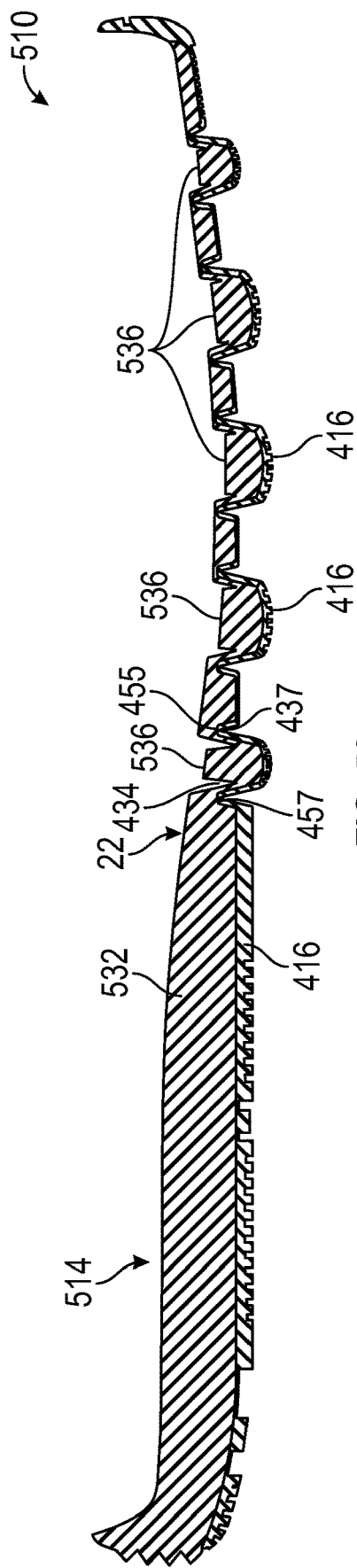
FIG. 50
FIG. 51
FIG. 52

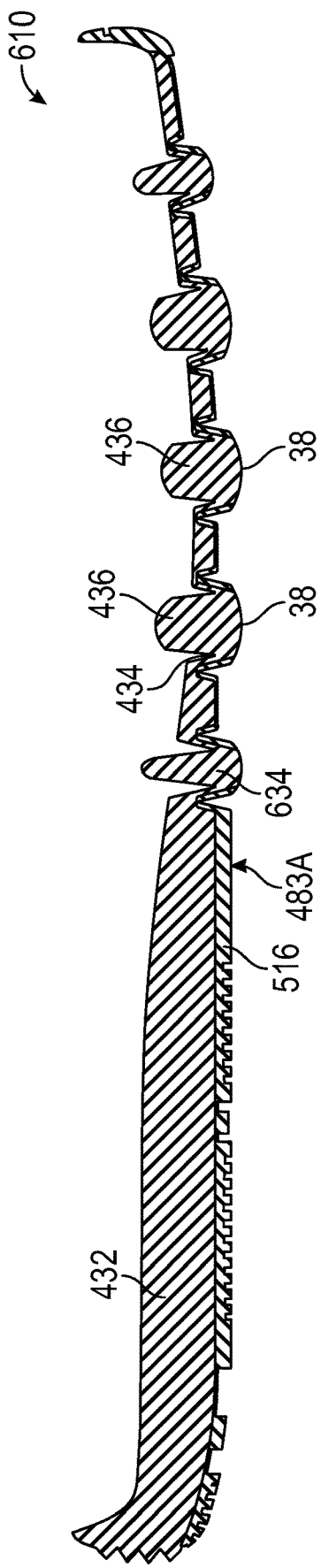
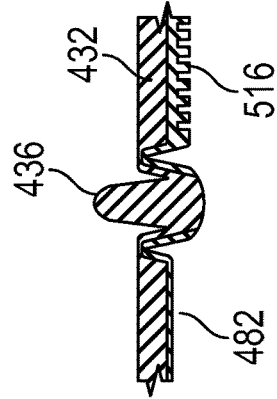
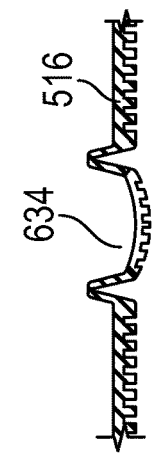
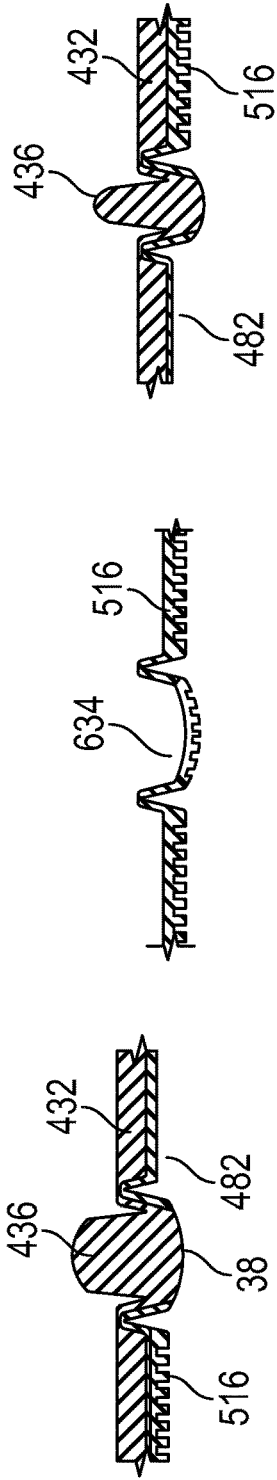
FIG. 55
FIG. 56
FIG. 57
FIG. 58

SOLE STRUCTURE WITH PROPRIOCEPTIVE ELEMENTS AND METHOD OF MANUFACTURING A SOLE STRUCTURE

CROSS-REFERENCE TO RELATED APPLICATION

This application is a divisional of U.S. patent application Ser. No. 15/958,120, filed on Apr. 20, 2018, which claims priority to, and the benefit of, U.S. Provisional Application No. 62/488,512, filed Apr. 21, 2017, both of which are hereby incorporated by reference in their entirety.

TECHNICAL FIELD

The present teachings generally include a sole structure for an article of footwear, and a method of manufacturing an article of footwear.

BACKGROUND

Footwear typically includes a sole structure configured to be located under a wearer's foot to space the foot away from the ground. Sole structures in athletic footwear are configured to provide one or more of desired cushioning, motion control, and resiliency.

BRIEF DESCRIPTION OF THE DRAWINGS

FIG. 50 is a cross-sectional view of the sole structure of FIG. 48 taken at lines 50-50 in FIG. 48.

FIG. 51 is a cross-sectional view of the sole structure of FIG. 48 taken at lines 51-51 in FIG. 48.

FIG. 52 is a cross-sectional view of the sole structure of FIG. 48 taken at lines 52-52 in FIG. 48.

FIG. 55 is a cross-sectional view of the sole structure of FIG. 53 taken at lines 55-55 in FIG. 53.

FIG. 56 is a cross-sectional view of the sole structure of FIG. 53 taken at lines 56-56 in FIG. 53.

FIG. 57 is a cross-sectional view of the sole structure of FIG. 53 showing only the outsole and taken at the same lines as FIG. 56.

FIG. 58 is a cross-sectional view of the sole structure of FIG. 53 taken at lines 58-58 in FIG. 53.

DESCRIPTION

Figure 1:
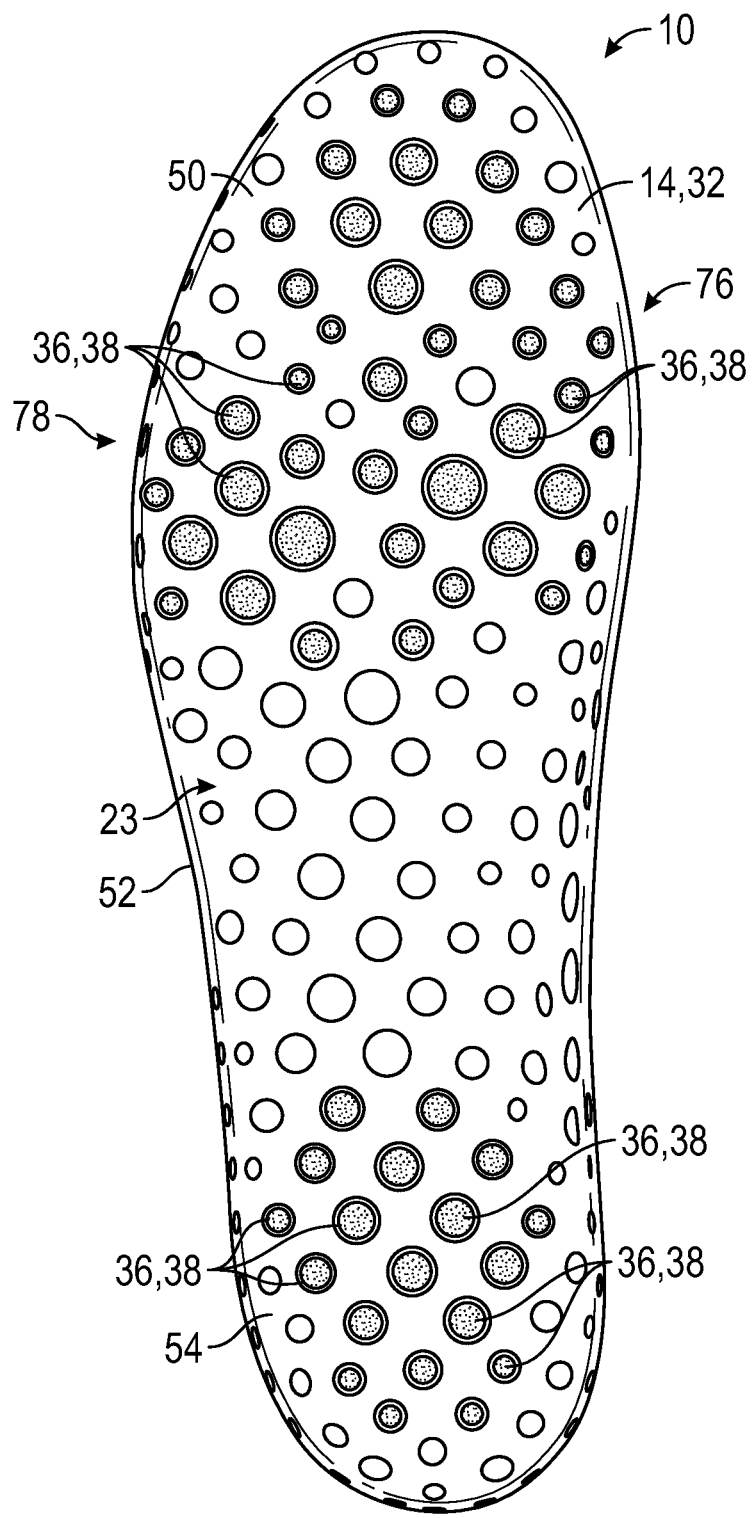
FIG. 1 is a bottom view of a sole structure for an article of footwear including a midsole having a midsole body and proprioceptive elements.

A sole structure for an article of footwear comprises a midsole body having a proximal surface and a distal surface. The midsole body has a first set of holes extending through the midsole body from the proximal surface to the distal surface, a second set of holes extending through the midsole body from the proximal surface to the distal surface, and a cleft extending partway through the midsole body between the first set of holes and the second set of holes. The center axes of holes of the first set are parallel with center axes of holes of the second set with the cleft open, and are nonparallel with the center axes of the holes of the second set with the cleft closed. Accordingly, as discussed herein, the cleft allows the midsole body to be manufactured via a relatively simple manufacturing process, using straight pins while enabling different sets of angled holes angling in different directions in the finished article of footwear.

In an embodiment, the cleft is in the proximal surface and extends along a longitudinal axis of the midsole body. The first set of holes may be disposed between a medial periphery of the midsole body and the cleft, and the second set of holes may be disposed between a lateral periphery of the midsole body and the cleft. In such an embodiment, the center axes of the holes of the first set angle laterally outward from the proximal surface of the midsole body to the distal surface of the midsole body such that a distal end of each hole of the first set is nearer to the medial periphery than is a proximal end of the hole, and the center axes of the holes of the second set angle laterally outward from the proximal surface of the midsole body to the distal surface of the midsole body such that a distal end of each hole of the second set is nearer to the lateral periphery than is a proximal end of the hole.

In an embodiment, the midsole body is a polymeric foam and includes an interior portion, and a skin that covers the interior portion. The skin extends along each hole of the first set and each hole of the second set from the proximal surface to the distal surface. The skin has a first density, and the interior portion has a second density less than the first density such that the midsole body has a greater compressive stiffness under a force of the midsole body along the center axis of each hole than transverse to the center axis. Because the holes are formed in the mold via the molding process rather than a secondary process, the skin lines the holes. The holes can be angled in correspondence with expected directions of forces in the sole structure, thus utilizing the properties of the skin to increase compressive stiffness in reaction to the forces.

In an embodiment, the sole structure includes a plurality of proprioceptive elements. Each proprioceptive element is disposed in a different hole of the first set or of the second set, and is translatable relative to the midsole body along a central axis of the respective hole in a direction toward the proximal surface under a force along the central axis at a distal end of the proprioceptive element. In this manner, the proprioceptive elements provide sensory feedback to a wearer regarding the position of an object, such as a ball, on the sole structure.

In an embodiment, a connecting web is integral with the plurality of proprioceptive elements at either proximal ends or distal ends of the plurality of proprioceptive elements such that the connecting web and the plurality of proprioceptive elements are a single, unitary component. In such an embodiment, the connecting web may be integral with the plurality of proprioceptive elements at proximal ends of the plurality of proprioceptive elements. The connecting web lifts away from the midsole body with any ones of the plurality of proprioceptive elements that translate relative to the midsole body in a direction toward the proximal surface. The connecting web advantageously enables the interconnected proprioceptive elements to be disposed in the respective holes of the midsole body simultaneously. In other embodiments without a connecting web, the proprioceptive elements can be disposed in the respective holes individually.

In an embodiment, a sock overlies the connecting web such that the proximal ends of the plurality of proprioceptive elements translate into a foot-receiving cavity of the sock. In the same or a different embodiment, an outsole is secured to the distal surface of the midsole body. The outsole may be integral with the plurality of proprioceptive elements at distal ends of the plurality of proprioceptive elements.

In an embodiment, one or more of the plurality of proprioceptive elements is cylindrical or discoid. The proprioceptive elements may include silicone proprioceptive elements disposed in at least one of the first set of holes or the second set of holes at a heel region of the midsole body. The first set of holes may include holes having different diameters. Additionally, the second set of holes may include holes having different diameters. One or more holes of the first set may have a different diameter than one or more holes of the second set. Alternatively or in addition, at least one or more holes within the first set may have a different diameter than one or more other holes of the first set. Alternatively or in addition, at least one or more holes within the second set may have a different diameter than one or more other holes of the second set. Accordingly, the proprioceptive elements may be of different sizes and diameters.

In an embodiment, the first set of holes and the second set of holes are disposed in one or both of a bottom portion or a sidewall portion of the midsole body, and in at least one of a forefoot region, a midfoot region, or a heel region of the midsole body.

A method of manufacturing an article of footwear comprises disposing polymeric material into a mold cavity of a mold for a midsole body. The mold has a mold surface with a protrusion. The method includes extending a first set of pins into the mold cavity on a first side of the protrusion, and a second set of pins into the mold cavity on a second side of the protrusion. The pins of the first set are parallel with the pins of the second set. The method includes molding the polymeric material to the shape of the mold surface, thereby forming a midsole body, the first set of pins forming a first set of holes in the midsole body, the second set of pins forming a second set of holes in the midsole body, and the protrusion forming a cleft between the first set of holes and the second set of holes. The method further includes withdrawing the first set of pins and the second set of pins from the midsole body, and removing the midsole body from the mold. Center axes of the holes of the first set of holes are parallel with center axes of the holes of the second set of holes when the cleft is open, and nonparallel with the holes of the second set when the cleft is closed.

The method may include disposing a first plurality of proprioceptive elements in at least some holes of the first set of holes, and a second plurality of proprioceptive elements in at least some holes of the second set of holes such that any of the first plurality and the second plurality of proprioceptive elements translate relative to the midsole body in a direction toward the proximal surface under a force along the central axes of the proprioceptive elements at the distal ends. The first plurality of proprioceptive elements may have a first density, and the second plurality of proprioceptive elements may have a second density different than the first density.

In an embodiment, a connecting web is integral with the first plurality of proprioceptive elements and with the second plurality of proprioceptive elements at proximal ends of the first plurality and the second plurality. In such an embodiment, disposing the first and second sets of proprioceptive elements in at least some of the holes of the first set and the second set includes positioning the connecting web over the proximal surface of the midsole body such that the first plurality of proprioceptive elements and the second plurality of proprioceptive elements are aligned with respective holes of the first set and the second set, and inserting the first plurality of proprioceptive elements and the second plurality of proprioceptive elements simultaneously.

In an embodiment, the method may further comprise securing an outsole to the distal surface of the midsole body, with the outsole spanning across the first set of holes and the second set of holes and across distal ends of the first plurality of proprioceptive elements and the second plurality of proprioceptive elements.

In an embodiment, the method may further comprise securing an elastic sockliner layer to the proximal surface of the midsole body, with the elastic sockliner layer spanning across the first set of holes and the second set of holes.

In an embodiment, the method may further comprise securing an inner sock to the proximal surface of the midsole body, and securing an outer sock to the distal surface of the midsole body such that the midsole body is disposed inside of the outer sock, and between the inner sock and the outer sock.

Within the scope of the present teachings, an article of footwear comprises a sole structure, including a midsole body having a proximal surface and a distal surface. The midsole body has a first set of holes extending through the midsole body from the proximal surface to the distal surface, a second set of holes extending through the midsole body from the proximal surface to the distal surface, and a cleft extending partway through the midsole body between the first set of holes and the second set of holes. Center axes of holes of the first set are parallel with center axes of holes of the second set with the cleft open, and are nonparallel with the center axes of the holes of the second set with the cleft closed.

In an embodiment, the article of footwear further comprises a plurality of proprioceptive elements, each proprioceptive element disposed in a different hole of the first set or of the second set, and translatable relative to the midsole body along a central axis of the respective hole in a direction toward the proximal surface under a force along the central axis at a distal end of the proprioceptive element.

A sole structure for an article of footwear comprises a midsole body with a proximal surface and a distal surface. The midsole body has perforated holes established by perforations through the midsole body. The sole structure further includes a plurality of proprioceptive elements, each proprioceptive element disposed in a different one of the perforated holes as an integral portion of the midsole body surrounded by the perforations. Each proprioceptive element is movable relative to the midsole body along a central axis of the proprioceptive element in a direction toward the proximal surface under a force along the central axis at a distal end of the proprioceptive element. In an embodiment, the midsole body includes multiple flexible arms extending from each of the plurality of proprioceptive elements between the perforations.

In an embodiment, the perforated holes are disposed in one or both of a bottom portion or a sidewall portion of the midsole body, and in at least one of a forefoot region, a midfoot region, or a heel region of the midsole body. One or more of the plurality of proprioceptive elements may be cylindrical or discoid. At least some of the holes may have different diameters.

The sole structure may further comprise at least some punched holes extending through the midsole body from the proximal surface to the distal surface. At least some of the punched holes may be empty.

In an embodiment, an inner sock is disposed inside of an outer sock, and the midsole body is disposed inside of the outer sock, and between the inner sock and the outer sock. The proximal surface of the midsole body is secured to a distal surface of the inner sock, and the distal surface of the midsole body is secured to a proximal surface of the outer sock.

A method of manufacturing an article of footwear may comprise perforating holes in a midsole body such that the perforated holes extend through the midsole body and define a plurality of integral proprioceptive elements, each proprioceptive element disposed in a different one of the perforated holes as an integral portion of the midsole body surrounded by perforations. Each integral proprioceptive element is movable relative to the midsole body along a central axis of the proprioceptive element in a direction toward the proximal surface under a force along the central axis at a distal end of the proprioceptive element.

The method may further comprise punching out multiple ones of the perforated holes at the perforations such that a plurality of punched through-holes extend from the proximal surface to the distal surface. The method may further comprise disposing a plurality of proprioceptive elements in the punched through-holes, each of the plurality of proprioceptive elements disposed in a different one of the punched through-holes. The plurality of proprioceptive elements may have a density different than a density of the midsole body.

In an embodiment, the punched through-holes may include a first set of punched through-holes in a forefoot region of the midsole body, and a second set of punched through-holes in a heel region of the midsole body. At least some of the plurality of proprioceptive elements disposed in the first set of punched through-holes may have a different density than at least some of the plurality of proprioceptive elements disposed in the second set of punched through-holes.

The method may further comprise securing an elastic sockliner layer to the proximal surface of the midsole body, with the elastic sockliner layer spanning across the punched through-holes. In the same or a different embodiment, the method may further comprise securing an outsole to the distal surface of the midsole body.

The method may further comprise securing an inner sock to the proximal surface of the midsole body, and securing an outer sock to the distal surface of the midsole body such that the midsole body is disposed inside of the outer sock, and between the inner sock and the outer sock.

A sole structure for an article of footwear comprises a midsole body with a proximal surface and a distal surface. The midsole body has a plurality of annular holes at the proximal surface, and a plurality of annular recesses in the distal surface. Each annular recess encircles a different annular hole of the plurality of annular holes from below, and extends beyond a lowest extent of the annular hole toward the proximal surface. The midsole body also has a plurality of proprioceptive elements, each centered in a different annular hole of the plurality of annular holes. Each proprioceptive element translates along a central axis of the proprioceptive element in a direction toward the proximal surface under a force along the central axis at a distal end of the proprioceptive element such that the midsole body articulates at the proprioceptive element.

In an embodiment, at least one of the plurality of proprioceptive elements has a height less than a depth of the annular hole in which the proprioceptive element is centered. In the same or a different embodiment, at least one proprioceptive element of the plurality of proprioceptive elements has a height greater than a depth of the annular hole in which the proprioceptive element is centered.

In an embodiment, the sole structure further comprises an outsole secured to the distal surface of the midsole body and lining the plurality of annular recesses. The outsole has a proximal surface with annular protrusions nested in the annular recesses of the midsole body. The outsole may be further secured to distal ends of the plurality of proprioceptive elements. In an alternative embodiment, the outsole may have through-holes that are aligned with and underlie the plurality of proprioceptive elements such that each of the plurality of proprioceptive elements is exposed at a distal surface of the outsole.

In an embodiment, the outsole has external flex grooves at a distal surface of the outsole and extending between adjacent ones of the plurality of proprioceptive elements. The external flex grooves may extend along lines connecting center axes of the adjacent ones of the plurality of proprioceptive elements.

The sole structure may further comprise a sockliner overlying the midsole body. The sockliner may include an elastic layer overlying the plurality of proprioceptive elements. The sockliner may further include a foam layer between the elastic layer and the midsole body. The foam layer may have holes aligned with the plurality of proprioceptive elements such that the plurality of proprioceptive elements extend through the foam layer toward the elastic layer. The elastic layer is an innermost layer of the sole structure. The elastic layer is in direct contact with the proximal end of each of the plurality of proprioceptive elements. The outsole is secured to the distal surface of the midsole body. The outsole includes a plurality of annular protrusions. The distal surface of the midsole body includes a plurality of midsole recessed surface portions each defining one of the plurality of annular recesses. Each of the plurality of annular recesses includes one of the plurality of midsole recessed portions. The outsole has an outsole distal surface and an outsole proximal surface opposite the outsole distal surface. The outsole proximal surface includes a plurality of outsole protruded surface portions each defining one of the plurality of annular protrusions and each directly connected to a different one of the midsole recessed surface portions so that the outsole lines each of the plurality of annular recesses. Each of the plurality of annular protrusions includes one of the plurality of protruded outsole surface portions. The outsole distal surface includes a plurality of outsole recessed surface portions each being opposite to a respective one of the plurality of outsole protruded surface portions. Each of the plurality of proprioceptive elements has a proximal end opposite the distal end. Each of the plurality of proprioceptive elements has a side surface interconnecting the proximal end and the distal end. The outsole proximal surface of the outsole is secured to the side surface of each of the plurality of proprioceptive elements.

The sole structure may be in combination with an upper and a strobel secured to the upper. The strobel may be secured to the proximal surface of the midsole body and may have holes aligned with the holes of the foam layer and with the plurality of proprioceptive elements such that the plurality of proprioceptive elements protrudes through both the holes of the strobel and the holes of the foam layer when interfacing with the elastic layer.

A method of manufacturing an article of footwear comprises forming a midsole body such that the midsole body has annular holes in a proximal surface of the midsole body, and annular recesses in a distal surface of the midsole body. Each annular recess encircles a different one of the annular holes from below and extends beyond a lowest extent of the different one of the annular holes toward the proximal surface. The midsole body as formed also includes a plurality of proprioceptive elements, each proprioceptive element centered in a different one of the annular holes.

The method may further comprise securing a sockliner to the proximal surface of the midsole body. The sockliner may have a plurality of holes that align with the plurality of proprioceptive elements such that the plurality of proprioceptive elements extends through the plurality of holes in the sockliner.

The method may further comprise securing an elastic sockliner top layer to the proximal surface of the sockliner, with the elastic sockliner top layer spanning across the plurality of holes of the sockliner such that the plurality of proprioceptive elements protrudes through the holes of the sockliner when interfacing with the elastic sockliner top layer.

The method may further comprise securing a strobel to the proximal surface of the midsole body. The strobel has holes that align with the plurality of proprioceptive elements. The method may also comprise securing a sockliner to the proximal surface of the strobel. The sockliner has holes that align with the plurality of proprioceptive elements. The method may also comprise securing an elastic sockliner top layer to a proximal surface of the sockliner, with the elastic sockliner top layer spanning across the holes of the sockliner such that the plurality of proprioceptive elements protrudes through the holes of the strobel and the holes of the sockliner when interfacing with the elastic sockliner top layer.

In an embodiment, the method further comprises securing an outsole to the distal surface of the midsole body. The outsole lines the annular recesses of the midsole body. The outsole may have through-holes. Securing the outsole may include aligning the through-holes of the outsole with the plurality of proprioceptive elements such that the plurality of proprioceptive elements is exposed at a distal surface of the outsole.

An article of footwear comprises a sole structure including a midsole body with a proximal surface and a distal surface. The midsole body has perforated holes established by perforations through the midsole body. The midsole body also has a plurality of proprioceptive elements, each proprioceptive element disposed in a different one of the perforated holes as an integral portion of the midsole body surrounded by the perforations and movable relative to the midsole body along a central axis of the proprioceptive element in a direction toward the proximal surface under a force along the central axis at a distal end of the proprioceptive element.

A sole structure for an article of footwear comprises a midsole body having a proximal surface and a distal surface, and an outsole having a proximal surface and a distal surface. The proximal surface of the outsole is secured to a distal surface of the midsole body. The outsole includes external flex grooves at the distal surface of the outsole, and the midsole body includes internal flex grooves at the proximal surface of the midsole body. The internal flex grooves overlie and are aligned with the external flex grooves such that the sole structure articulates at the external flex grooves both in dorsiflexion and in plantarflexion.

The above features and advantages and other features and advantages of the present teachings are readily apparent from the following detailed description of the modes for carrying out the present teachings when taken in connection with the accompanying drawings.

Figure 4:
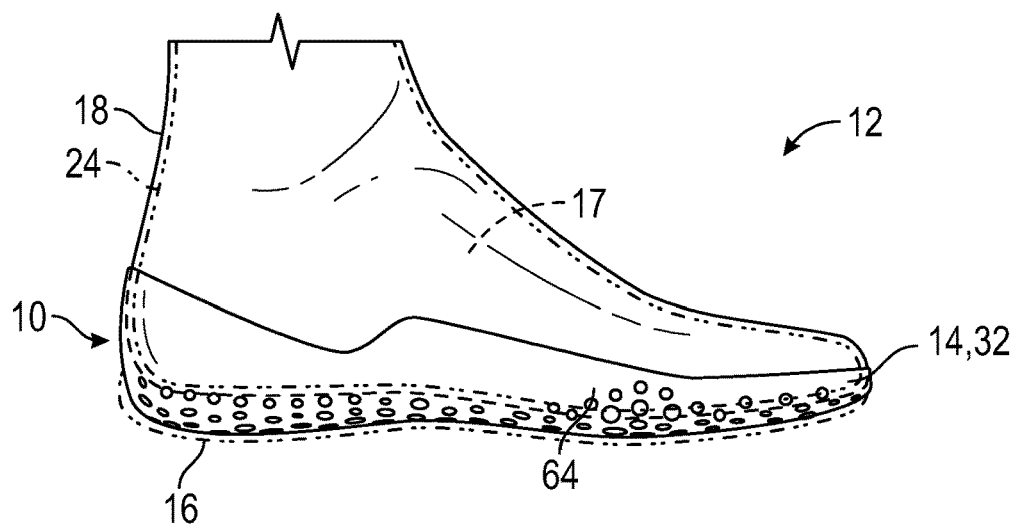
FIG. 4 is a lateral side view of the sole structure of FIG. 1.
Figure 6:
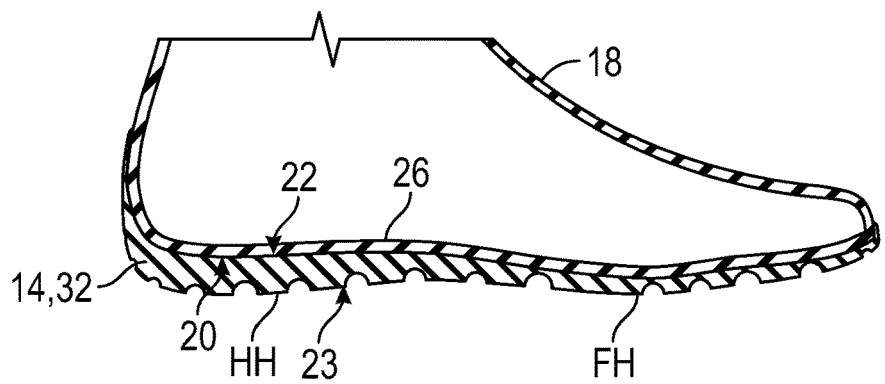
FIG. 6 is a cross-sectional view of the sole structure of FIG. 2 taken at lines 6-6 in FIG. 2 and inverted relative to FIG. 2.
Figure 15:
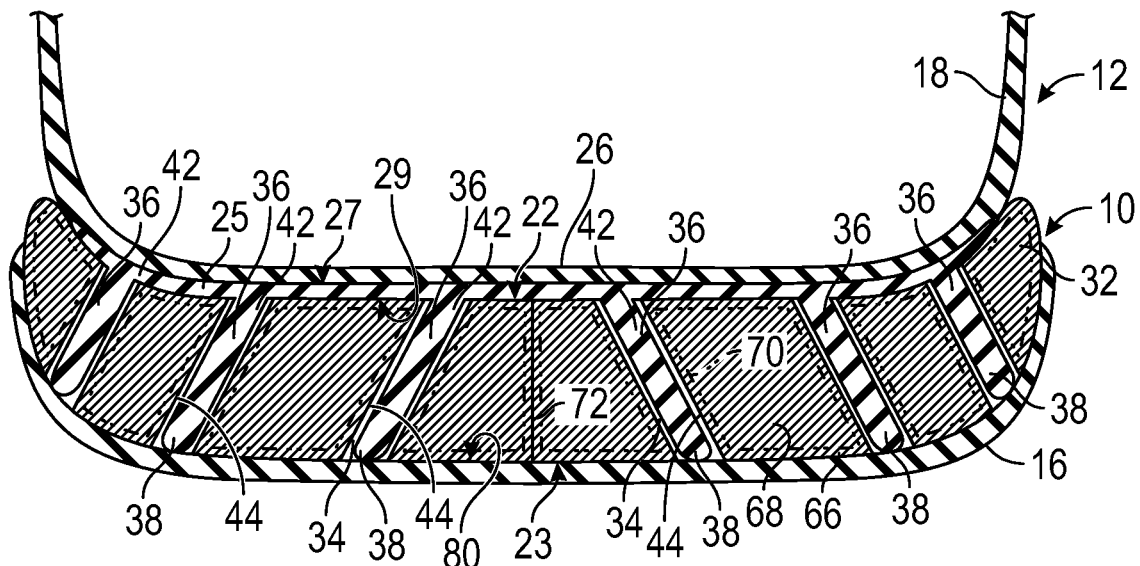
FIG. 15 is a cross-sectional and fragmentary view of an article of footwear including the sole structure of FIG. 1, an outsole, and an upper.

Referring to the drawings, wherein like reference numbers refer to like components throughout the views, FIG. 1 is a bottom view of a portion of a sole structure 10 for an article of footwear 12 shown in FIGS. 4 and 15. FIG. 1 shows a midsole 14 of the sole structure 10. The midsole 14 includes a midsole body 32 with a plurality of holes 34 that open at the proximal surface 22. The midsole body 32 may be a polymeric foam material that provides cushioning and support. In the embodiment shown, the holes 34 are through-holes that extend from the proximal surface 22 of the midsole body 32 to a distal surface 23 of the midsole body 32. The distal surface 23 is shown in the bottom view of FIG. 1 and is indicated in FIG. 6.

Figure 2:
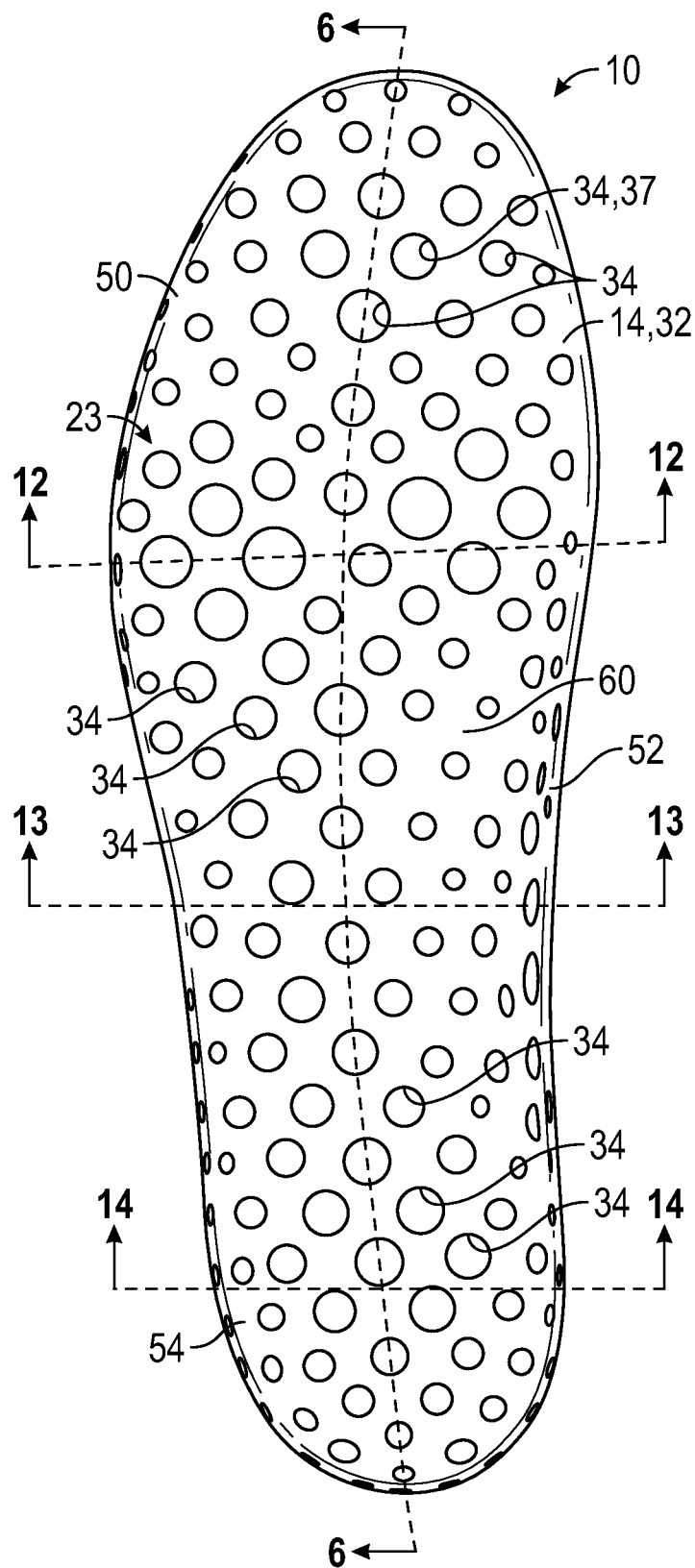
FIG. 2 is a bottom view of the midsole body of FIG. 1 with the proprioceptive elements removed.

The midsole 14 also includes a plurality of proprioceptive elements 36 disposed in some of the holes 34 such that they are translatable in the holes 34 as described herein. The proprioceptive elements 36 are indicated with dot shading for clarity. Distal ends 38 of the proprioceptive elements 36 are shown. FIG. 2 shows the midsole 14 prior to installation of the proprioceptive elements 36 in the holes 34. A flexible outsole 16 (shown in phantom in FIG. 4 and in cross-sectional view in FIG. 15) and an upper 18 (shown in FIG. 4) are not shown in FIG. 1.

The sole structure 10 is one of many embodiments of sole structures disclosed herein that include proprioceptive elements that enhance a wearer's awareness of an object in contact with the article of footwear, and of the location of contact of the object on the article of footwear. For example, a midsole with proprioceptive elements as discussed herein improves proprioceptive feedback (i.e., tactile feedback), which may enhance ball control in ball sports, such as soccer. The sole structures disclosed herein may also have enhanced ability to grip a ball, such as due to protrusions of distal ends of the proprioceptive elements at a distal surface of the outsole, and/or due to the ability of the outsole and midsole to flex together both during dorsiflexion and plantarflexion. Other features and advantages of the various embodiments of sole structures with proprioceptive elements are set forth in the discussion herein.

Figure 60:
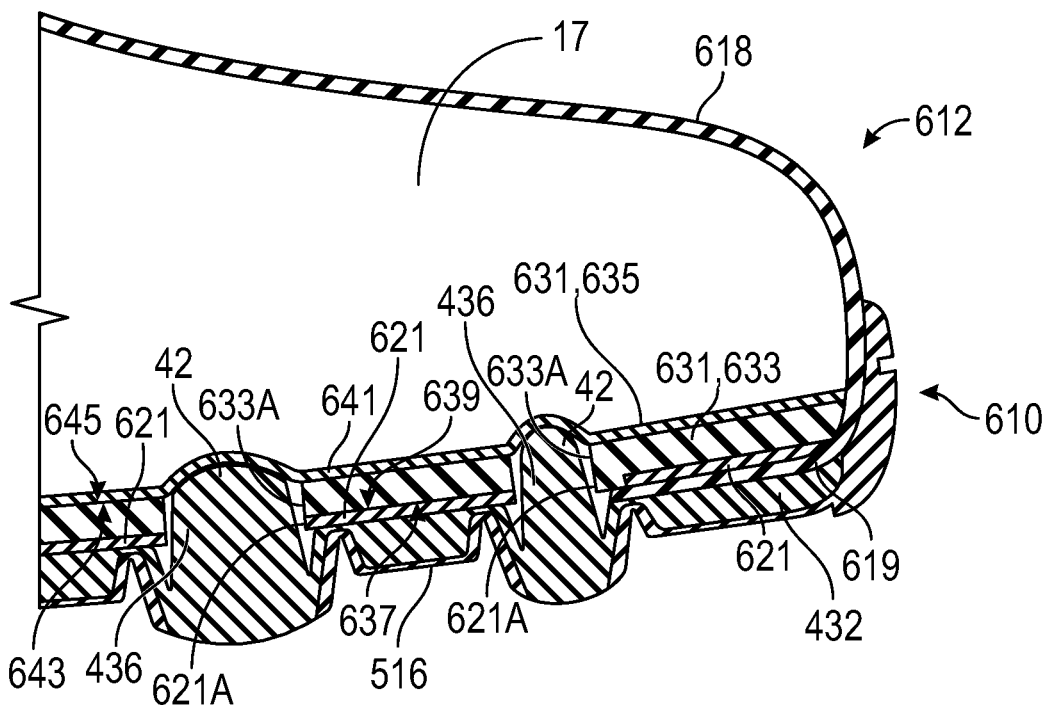
FIG. 60 is a cross-sectional and fragmentary view of the article of footwear of FIG. 59.

With reference to FIG. 4, the article of footwear 12 includes an upper 18 secured to the sole structure 10. In the embodiment shown, the upper 18 is a sock construction, such as a bootie, and may be a unitary, 360-degree knit material that has a distal surface 20 secured to a proximal surface 22 of the sole structure 10 (best shown in FIG. 6). The upper 18 thus wraps under a foot 24 received in a foot-receiving cavity 17 of the upper 18, and includes an underfoot portion 26 (see FIGS. 6 and 15) in lieu of a strobel. Alternatively, the upper 18 may terminate at a lower periphery that is secured to a strobel, with the strobel secured to the sole structure 10 similar to upper 618 in FIG. 60. In some embodiments, both a strobel having holes aligned with the holes 34 in the midsole body 32, and a sockliner having holes aligned with the holes in the strobel may overlay the midsole 14. An upper layer of the sockliner may directly overlay the proprioceptive elements 36 between the foot 24 and the proprioceptive elements 36. FIG. 60 shows such an upper layer 635, which is a relatively thin, flexible, elastically-stretchable material, such as a four-way stretch fabric. However, in the sole structure 10 of FIG. 1, the midsole body 32 has a thickness sufficient such that a sockliner is not used. In another alternative embodiment, the midsole body 32 could be placed between an inner sock and an outer sock, as described with respect to the midsole body 232 of FIGS. 37-39.

In some embodiments, the proprioceptive elements may be integrally secured to or formed as a unitary, one-piece component with a sockliner, with the proprioceptive elements extending downward therefrom into the holes of the midsole body. In still other embodiments, the proprioceptive elements could be integrally secured to or formed integrally with a connecting web (i.e., a flat, flexible layer interconnected with the proprioceptive elements) and extend therefrom into the holes of the midsole body from the proximal side of the midsole body so that all of the proprioceptive elements can be handled together in unison via the connecting web. The connecting web can be secured at select locations to the proximal surface of the midsole (or, in some embodiments, to the distal surface of the midsole body) such that translation of the proprioceptive elements as described herein is not unduly limited. For example, the web may be left disconnected from the midsole surface at regions around each of the proprioceptive elements.

In still other embodiments, the proprioceptive elements could be integrally secured to or formed integrally with the outsole such that the proprioceptive elements extend into the holes of the midsole body from a proximal surface of the outsole. In still other embodiments, the proprioceptive elements could be separate from one another, each having a flange at its distal end or proximal end. The midsole body could have corresponding recesses that receive the flange such that the proprioceptive elements extend into the holes. These recesses could be either in the proximal surface or the distal surface of the midsole body. If on the proximal side, the recesses could be configured with a depth corresponding to a thickness of the flange such that the proximal surface of the flange is flush with the proximal surface of the midsole body when received in the recess.

Figure 3:
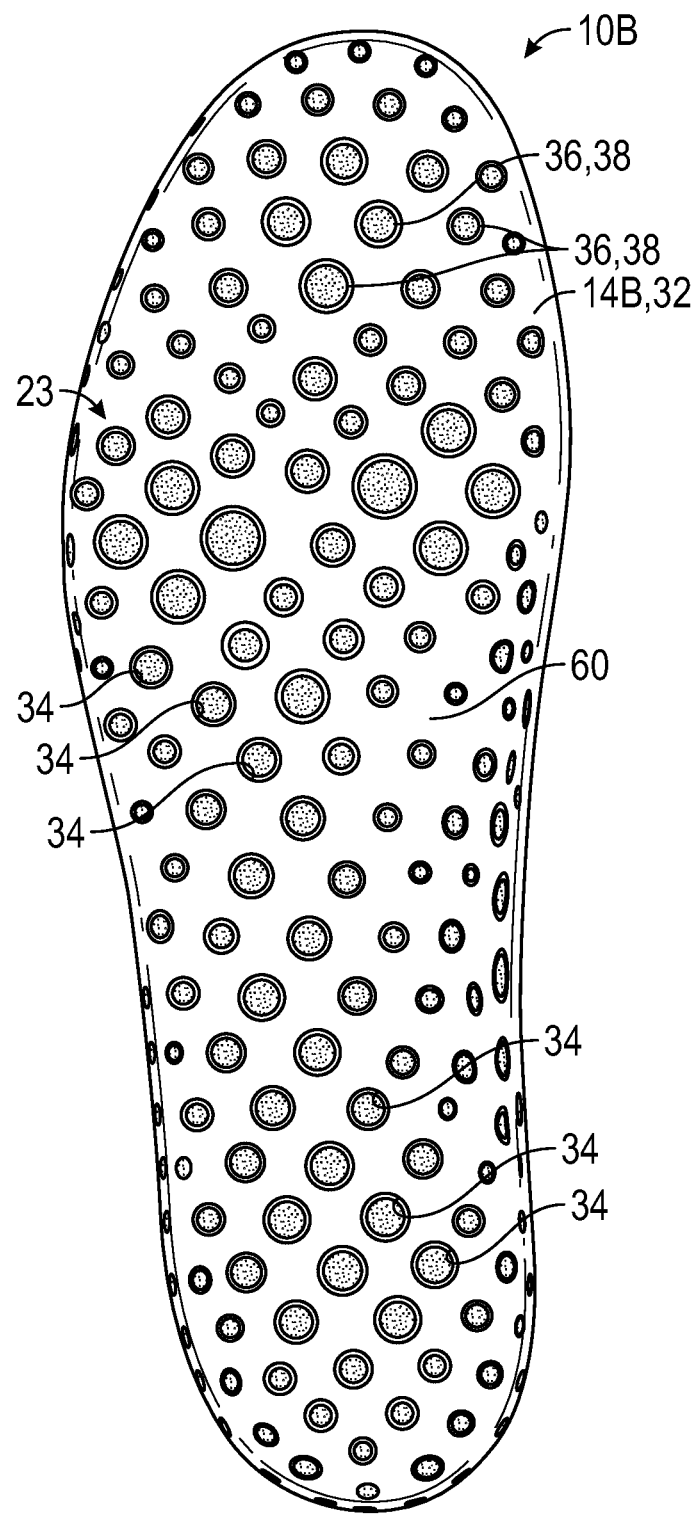
FIG. 3 is an alternative embodiment in bottom view of a sole structure for an article of footwear including a midsole having a midsole body and proprioceptive elements.

As best shown in FIG. 15, the proprioceptive elements 36 are disposed in the holes 34 such that they are not secured to and are translatable relative to the interior walls 44 of the midsole body 32 within the holes 34. The midsole body 32 thus serves as a frame that carries the proprioceptive elements 36. Each proprioceptive element 36 is disposed in a different one of the holes 34. All of the holes 34 may contain a proprioceptive element 36, or some of the holes 34 may be left empty, such that they do not have a proprioceptive element 36 in them. FIG. 1 is an embodiment in which only some of the holes 34 contain a proprioceptive element 36. FIG. 3 is an alternative embodiment of a sole structure 10B with a midsole 14B including midsole body 32 and in which each hole 34 contains a proprioceptive element 36.

Figure 17:
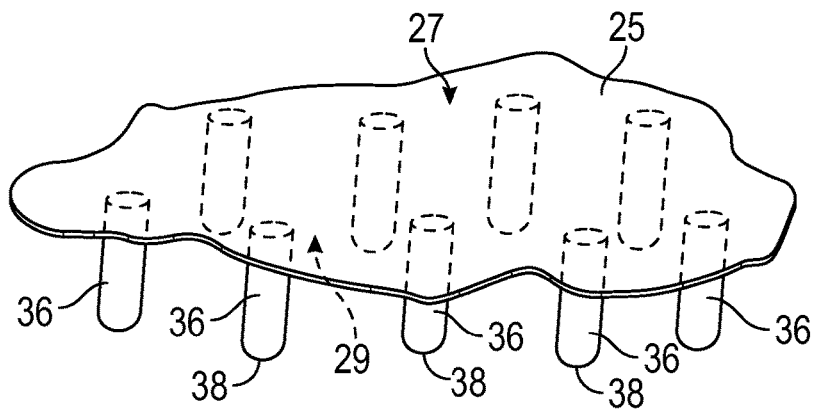
FIG. 17 is a fragmentary illustration in perspective view of the proprioceptive elements and a connecting web.
Figure 18:
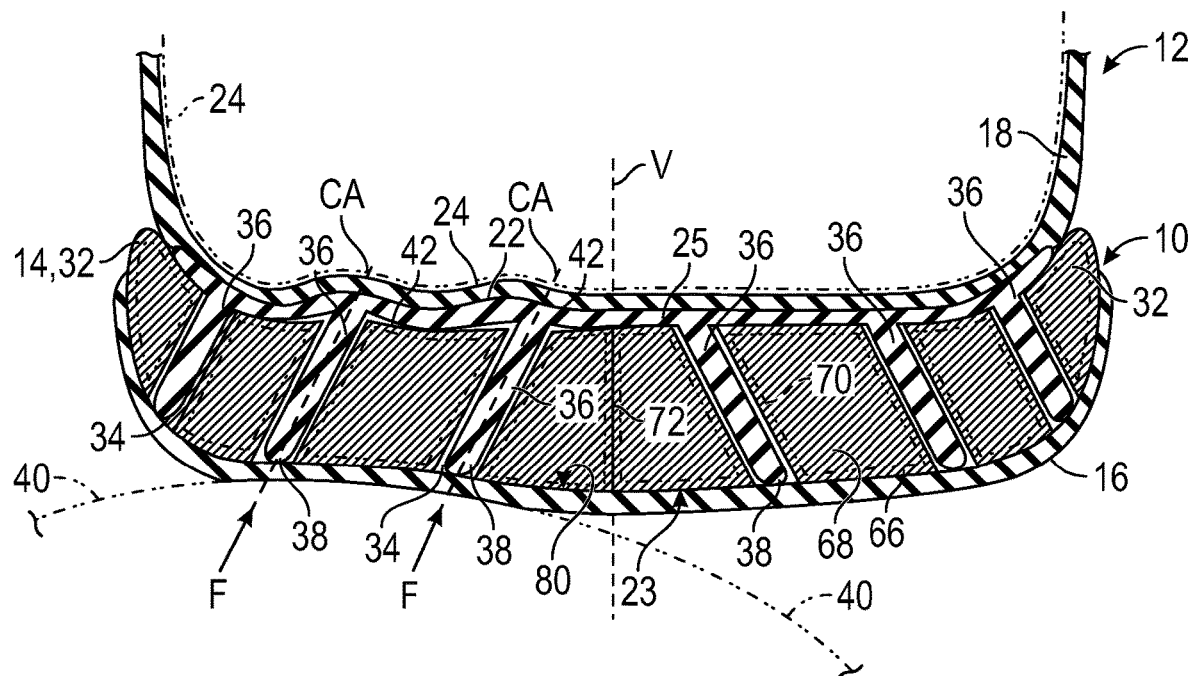
FIG. 18 is a cross-sectional and fragmentary view of the article of footwear of FIG. 15 and an object in phantom providing forces on some of the proprioceptive elements.

In the embodiment shown, the proprioceptive elements 36 are integrally formed with a connecting web 25 as a unitary, one-piece component, as best shown in FIGS. 15, 17, and 18. Proximal ends 42 of the proprioceptive elements 36 are integral with the web 25, while distal ends 38 extend into the holes 34 and rest at or above the proximal surface of the outsole 16, which is exposed at the bottom of each hole 34. The distal surface of the upper 18 is secured to the proximal surface 27 of the web 25. Alternatively, the proprioceptive elements 36 could be integrally formed in the same way with a sockliner, in embodiments in which a sockliner is used. In that case, no web would be included, as the sockliner would be positioned in place of the web, and would connect all of the proprioceptive elements 36. In yet another embodiment, the connecting web 25 could be removed in FIG. 15, and the distal ends 38 could be integrally formed with the outsole 16. The proximal ends 42 could then extend upward toward the upper 18 in the holes 34, without connection to any other component.

The proprioceptive elements 36 are narrower than the holes 34. Stated differently, the diameters of the proprioceptive elements 36 are less than the diameters of the holes 34. Accordingly, the proprioceptive elements 36 are spaced apart from the interior walls 44 of the holes 34, or at least are not secured thereto such that they are movable relative to the walls 44. As best shown in FIG. 18, each proprioceptive element 36 is movable relative to the midsole body 32 along a central axis CA of the proprioceptive element 36 in a direction toward the proximal surface 22 of the midsole body 32 when under a force F along the central axis at a distal end 38 of the proprioceptive element 36. In FIG. 18, the forces F on the proprioceptive elements 36 are due to a ball 40 under the sole structure 10 being controlled by the wearer. The ball 40 is on the ground, and trapped between the ground and the wearer's foot 24 by the article of footwear 12. The translation of the proprioceptive elements 36 under the forces F causes the proximal ends 42 of some of the proprioceptive elements 36 to be pressed toward the foot 24 relative to the midsole body 32 at the proximal surface 22. More specifically, those ones of the proprioceptive elements 36 that are subjected to forces by the ball 40 will translate relative to the midsole body 32 in this manner, and may be considered active for the particular ball position. The flexible connecting web 25 at the active proprioceptive elements 36 will also translate toward the foot 24 under the force of the translating proprioceptive elements 36. The flexible connecting web 25 is secured to the proximal surface 22 of the midsole body 32, but not in a small region directly surrounding each of the proprioceptive element 36. This enables the connecting web 25 to lift away from the midsole body 32, if necessary, with the translating, active proprioceptive elements 36. For example, a circular region of the distal surface 29 of the connecting web 25 may be freely movable relative to (i.e., not bonded to) the proximal surface 22 of the midsole body 32. The connecting web 25 may be bonded to the midsole body 32 at other locations not within those regions (i.e., further from each proprioceptive element 36). Other proprioceptive elements 36 not in contact with the ball 40 do not experience the same degree of translation, and may be considered inactive for the particular ball position. The inactive proprioceptive elements 36 will not be pressed toward the foot 24, or at least not to as great an extent as the active proprioceptive elements 36. This dichotomy between active and inactive proprioceptive elements will be sensed by the wearer. The proprioceptive elements 36 are thus tactile components that act as sensory indicators to the wearer of the position of the ball 40 relative to the foot 24, enhancing ball control.

At least some of the proprioceptive elements 36 may have a different density than the midsole body 32 so that they are compressible relative to the midsole body 32 along their central axes. The midsole body 32 may have a first density, and the proprioceptive elements 36 may have a second density less than the first density. Alternatively, the second density may be greater than the first density. Some or all of the proprioceptive elements 36 may be more dense than the midsole body 32, or some or all may be less dense than the midsole body 32. Some or all could also have the same density as the midsole body 32.

In embodiments discussed herein, the proprioceptive elements may be generally compressed under the weight of the wearer when the outsole of the sole structure is on the ground. When the foot is lifted, however, and the sole structure is used to control a ball, the magnitude of loading on the sole structure is generally lower than when supporting the full weight of the wearer, such that the proprioceptive elements have a greater ability to translate relative to the midsole body 32 than when fully loaded, enhancing the proprioceptive feedback to the wearer at each proprioceptive element during ball handling.

As best shown in FIG. 15, the proprioceptive elements 36 may be referred to as plugs, and are disposed in the holes 34 but spaced apart from the interior walls 44 of the midsole body 32 that define the holes. Accordingly, the proprioceptive elements 36 do not in fact plug the holes. The holes 34 are cylindrical in shape, and the proprioceptive elements 36 may also be cylindrical. As shown, the proprioceptive elements 36 are elongated, with a length greater than their width. Depending on the thickness of the midsole body 32, some of the holes 34 could have a width greater than their length, in which case the proprioceptive element 36 disposed in that hole 34 may be a cylinder that is discoid (i.e., has a width greater than its length). In some embodiments, the proximal ends 42 and/or the distal ends 38 of the proprioceptive elements 36 may have a rounded shape or a conical shape, in which case only the midsection of the proprioceptive element is cylindrical. In an embodiment in which the proximal ends 42 and the distal ends 38 are flat, the entire proprioceptive element 36 is cylindrical.

Figure 5:
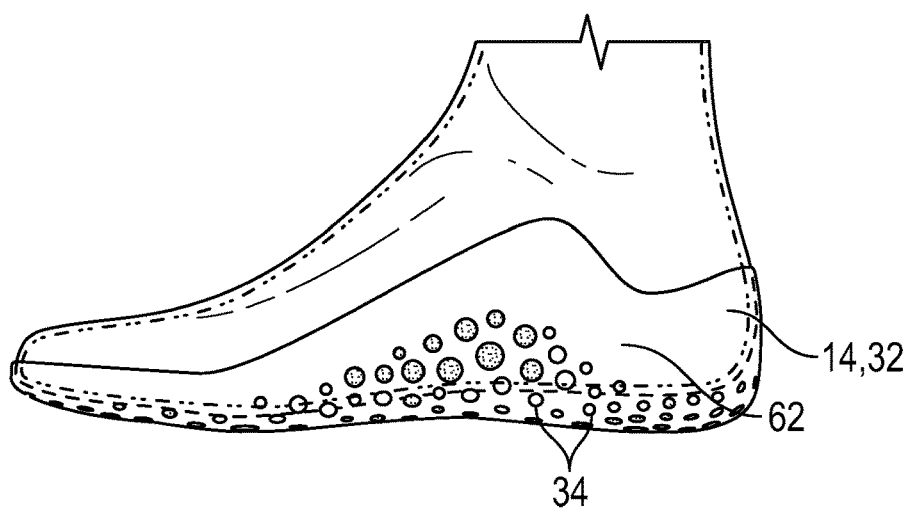
FIG. 5 is a medial side view of the sole structure of FIG. 1.
Figure 8:
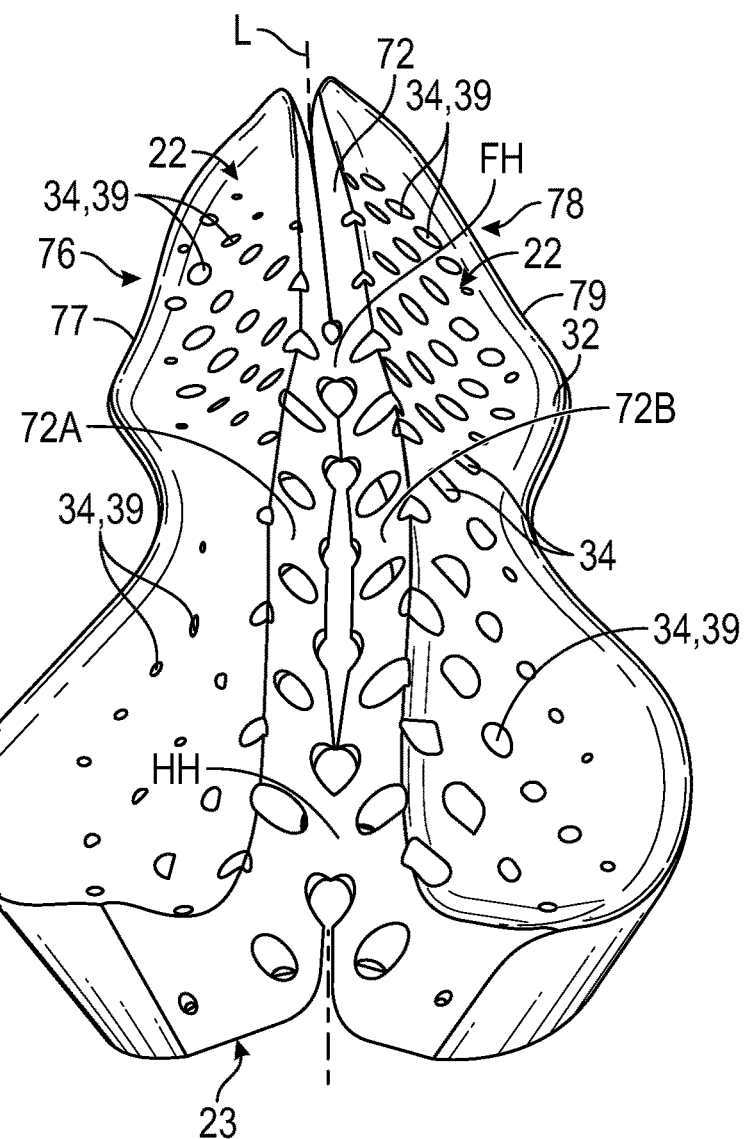
FIG. 8 is a perspective rear view of the midsole body of FIG. 2 showing a cleft in an open position.

With reference to FIG. 2, the midsole body 32 is shown as having holes 34 in each of a forefoot region 50, a midfoot region 52, and a heel region 54 of the midsole body 32. In other embodiments, the holes 34 may be disposed in only one of or any two of the forefoot region 50, the midfoot region 52, and the heel region 54. Each hole 34 has a distal opening 37, also referred to as a distal end 37, at the distal surface 23 of the midsole body 32. The distal ends 37 of the holes 34 are the ends shown in the bottom view of FIG. 2, for example. Each hole 34 also has a proximal opening 39, also referred to as a proximal end 39, at the proximal surface 22 of the midsole body 32 such that each hole 34 is a through-hole. FIG. 8 indicates the proximal ends 39 of the holes 34. The holes 34 are disposed in both of a bottom portion 60 (FIG. 2), a medial sidewall portion 62 (FIG. 5), and a lateral sidewall portion 64 (FIG. 4) of the midsole body 32. In other embodiments, holes 34 may be provided only in the bottom portion 60, or only in one or both of the sidewall portions 62, 64.

Figure 16:
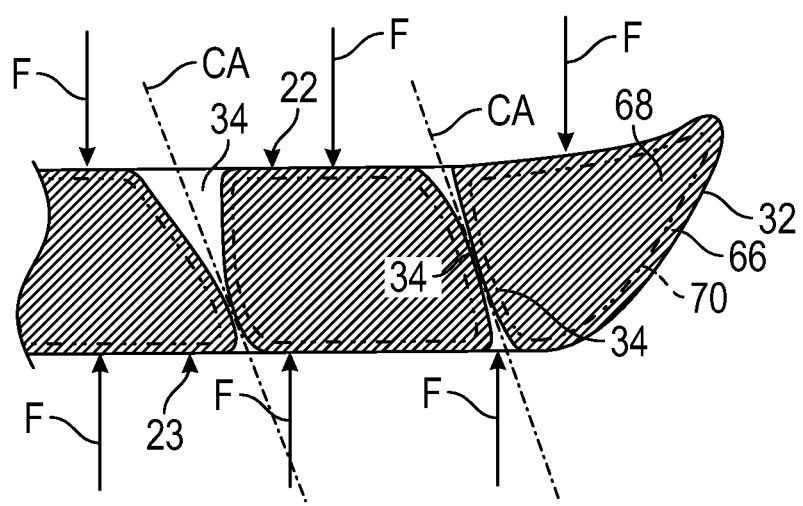
FIG. 16 is a cross-sectional and fragmentary view of the midsole body of FIG. 2.

The size, location, and angle of the center axis CA of a hole 34 relative to vertical V (see FIG. 12), as well as whether or not a proprioceptive element 36 is disposed in the hole 34 all contribute to the cushioning and proprioceptive sensory feedback of the midsole 14. As shown, the holes 34 have a variety of different diameters. In general, the midsole body 14 can provide greater cushioning at a hole 34 with a larger diameter than a hole 34 with a smaller diameter, due to the ability of the surrounding foam to collapse into the hole 34 under loading, assuming no proprioceptive element 36 is disposed in the hole 34. The collapse of the midsole body 32 into an empty hole 34 when under forces not aligned with the central axis CA of the hole 34 is indicated in FIG. 16.

The proprioceptive elements 36 may be disposed in regions at which ball handling is expected to occur. For example, in some sports, the forefoot region 50 and the heel region 54 may be used for ball handling more than the midfoot region 52. The forefoot region 50 and the heel region 52 may be used for rolling the ball underfoot, while the midfoot region 52 may be used more often for trapping the ball. Accordingly, proprioceptive elements 36 provided in the forefoot region 50 and the heel region 54 may be most useful for proprioception. In the embodiment of FIG. 1, forefoot proprioceptive elements 36 are shown in some of the holes 34 of the forefoot region 50, and heel proprioceptive elements 36 are shown in some of the holes 34 of the heel region 54. Holes 34 in the midfoot region 52 are empty (i.e., they contain no proprioceptive elements 36). The holes 34 containing proprioceptive elements 36 in the forefoot region 50 may be referred to as a first set of holes, and the holes 34 containing proprioceptive elements 36 in the heel region 54 may be referred to as a second set of holes 34. The proprioceptive elements 36 in the forefoot region 50 of FIG. 1 may have a density greater than or less than the density of the midsole body 32. In one embodiment, proprioceptive elements 36 are provided only in the forefoot region 50 and are a foam material that has a greater density than the material of the midsole body 32. Proprioceptive elements are also disposed in holes 34 in the heel region 54, and may be configured for impact cushioning as well as proprioception. For example, the proprioceptive elements 36 in the heel region 54 may be silicone. In some embodiments, a proprioceptive element 36 may completely fill a hole 34 and act as a plug. For example, proprioceptive elements 36 used in the heel region 54 for cushioning could be such plugs.

The midsole body 32 may be polymeric foam that is compression-molded according to a thermal process, with the holes 34 formed during the molding process rather than via a secondary process. All outer surfaces of a molded foam article, such as a molded midsole body 32, may have an outer skin 66 that is denser than an interior portion 68 of the midsole body 32 due to contact with the surfaces of the mold tools. The outer skin 66 of the midsole body 32 is indicated in FIG. 16, and is separated from the interior portion 68 by a representative boundary 70. Forming the holes 34 during molding via pins, as disclosed herein, will cause the interior walls 44 of the holes 34 to also have the dense outer skin 66. More particularly, the midsole body 32 includes an interior portion 68, and a skin 66 that covers the interior portion 68 and extends along each of the holes 34 from the proximal surface 22 to the distal surface 23. In a non-limiting example, the interior portion 68 may be an open-cell foam, or a closed-cell foam. In an open-cell foam, air moves out of the cell when the foam is compressed. Accordingly, the compressive stiffness of the foam is unaffected by the air in the cells. In a closed-cell foam, air is trapped in the cell, and compresses when the foam is compressed, thus affecting the compressive stiffness of the foam. The skin 66 has a first density, and the interior portion 68 has a second density less than the first density. Reference to a second density of the interior portion 68 may be numerically different than the second density of the proprioceptive elements 36 discussed herein, as first and second densities are relative terms used in comparison to two different components. The denser skin 66 forms a cylinder around each hole 34, bordering the hole 34 beginning at the interior wall 44 and extending into the midsole body 32 away from the interior wall 44 a short distance, forming an annular cylinder around the hole 34. A skin having a greater thickness will provide greater resistance to compression than a thinner skin. Conversely, a skin with a lesser thickness will allow the foam of the midsole around the holes to compress to a greater extent under a given load than a thicker skin. The cylinder of skin 66 around the hole 34 is most resistant to compression along its length, as the full length of the stiffer skin 66 must be compressed. The midsole body 32 thus has a greater compressive stiffness under loading along the center axis CA of a hole 34 than under loading transverse to the center axis CA, or than under loading at an oblique angle to the center axis CA (i.e., angles greater than zero degrees and less than 90 degrees). An empty hole 34, or a hole containing a proprioceptive element 36 of a lesser density than the midsole body 32, will provide cushioning and absorb forces that are not aligned with the center axis of a hole 34 by a partial or complete collapse of the foam midsole body 32 into the hole 34, as shown in FIG. 16. Forces aligned with the center axis CA, however, will be at least partially countered by the resistance of the tunnel-like skin 66 at the hole 34, resisting compression.

Figure 12:
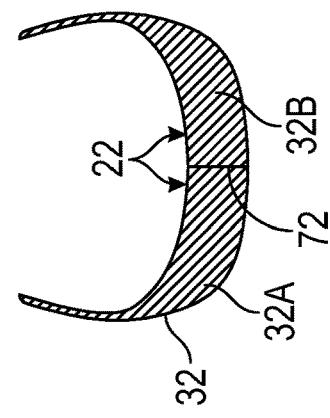
FIG. 12 is a cross-sectional view of the midsole body taken at lines 12-12 in FIG. 2 and inverted relative to FIG. 2, with the cleft closed.

As further discussed herein, the holes 34 are angled relative to a vertical axis V indicated in FIGS. 12 and 18. The angle A of the central axis CA of a hole 34 relative to the vertical axis V may be selected so that the central axis CA aligns with an expected direction of loading force on the midsole body 32 at the location of the hole 34, such as the expected direction of impact forces during walking or running, or from making a lateral movement, such as a cutting movement during sports. For example, in certain sports, lateral (i.e., sideways) cutting motions are common. Angles of holes 34 at the lateral sidewall 64 and/or the medial sidewall 62 may be selected to coincide with the lateral forces typically resulting from a lateral cutting motion.

Figure 7:
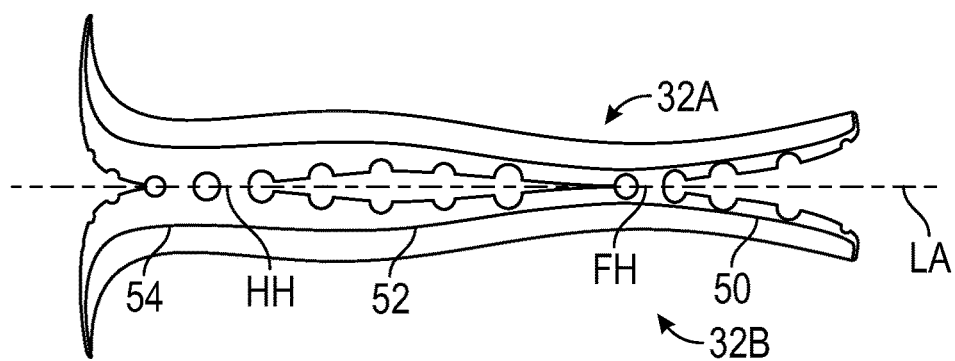
FIG. 7 is a schematic illustration of the midsole body of FIG. 2 showing hinge areas of the midsole body at a cleft in the midsole body.

In order to provide angled holes 34 with an outer skin 66 along the walls 44 of the midsole body 32 bordering the holes 34, the midsole body 32 is molded with a cleft 72 in the proximal surface 22 so that the midsole body 32 is in a "split open" position (referred to herein as a molded position), as shown in FIG. 8. In the embodiment shown, the cleft 72 extends along a longitudinal axis L of the midsole body 32. In other embodiments, a mold could be configured to provide a cleft that extends transversely. With a longitudinally-extending cleft 72 as shown in FIG. 8, when the cleft 72 is closed (as shown in FIG. 12), the resulting angled holes angle laterally-outward from the proximal surface 22 to the distal surface 23. In the open, molded position of the cleft 72 in FIG. 8, the central axes CA of the holes 34 extend vertically, and the center axes CA of the holes of the first set 76 are parallel with the center axes CA of the holes of the second set 78. As shown in FIG. 8, a first set 76 of holes 34 is disposed between a medial periphery 77 of the midsole body 32 and the cleft 72, and a second set 78 of holes 34 is disposed between a lateral periphery 79 of the midsole body 32 and the cleft 72. The proximal openings 39 of the first set 76 are disposed at a first portion of the proximal surface 22, and the proximal openings 39 of the second set 78 are disposed at a second portion of the proximal surface 22. The first set 76 of holes 34 may be referred to as a medial set 76, and the second set 78 of holes 34 may be referred to as a lateral set 78. The midsole body 32 is hinged at the cleft 72. Stated differently, the cleft 72 extends downward from the proximal surface 22 only partway to the distal surface 23 at least in some regions, such that a first portion 32A (e.g., a medial portion) of the midsole body 32 with the medial set 76 of holes 34 is connected to a second portion 32B (e.g., a lateral portion) of the midsole body 32 at least at connected portions referred to as a forefoot hinge FH and a heel hinge HH at the bottom of the cleft 72. FIG. 7 is a schematic depiction of the midsole body 32 if pressed even further open at the cleft 72 than the molded position of FIG. 8, so that the forefoot hinge FH and the heel hinge HH are apparent. The cleft 72 may extend completely through the midsole body 32 in some areas, such that the medial portion 32A and the lateral portion 32B may be completely split and disconnected from one another at an area rearward of the heel hinge HH, at an area forward of the forefoot hinge FH, and at an area between the forefoot hinge FH and the heel hinge HH, as shown in FIG. 7. This allows the distal surface 23 to curve upward toward the foremost extent of the midsole body 32 at the forefoot portion 50 forward of the forefoot hinge FH, the distal surface 23 to curve upward toward the rearmost extent rearward of the heel hinge HH, and the distal surface 23 to curve upward at the midfoot portion 52 between the heel hinge HH and the forefoot hinge FH.

Figure 9:
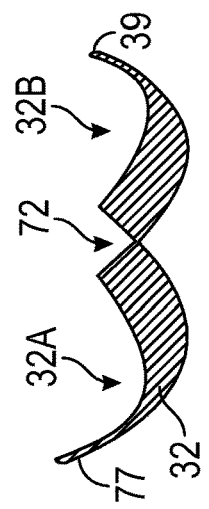
FIG. 9 is a cross-sectional view of the midsole body of FIG. 2 at the location of the cross-section of FIG. 12, and in an as-molded position with a cleft open.
Figure 10:
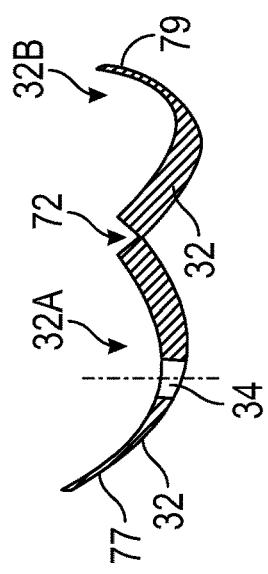
FIG. 10 is a cross-sectional view of the midsole body of FIG. 2 at the location of the cross-section of FIG. 13, and in an as-molded position with a cleft open.
Figure 11:
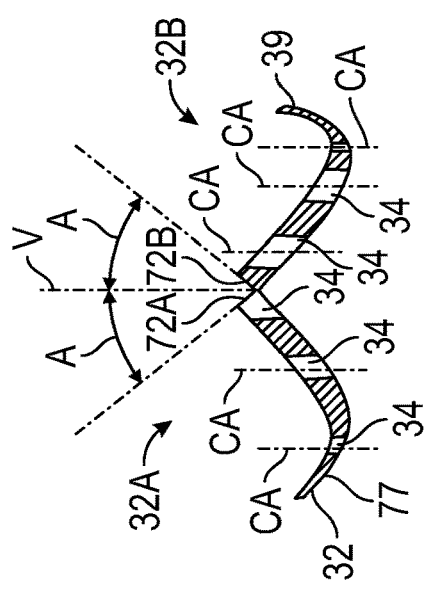
FIG. 11 is a cross-sectional view of the midsole body of FIG. 2 at the location of the cross-section of FIG. 14, and in an as-molded position with a cleft open.
Figure 13:
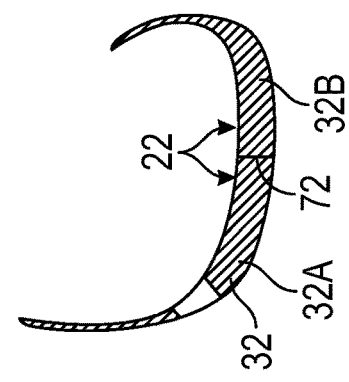
FIG. 13 is a cross-sectional view of the midsole body taken at lines 13-13 in FIG. 2 and inverted relative to FIG. 2, and in an as-molded position with the cleft closed.
Figure 14:
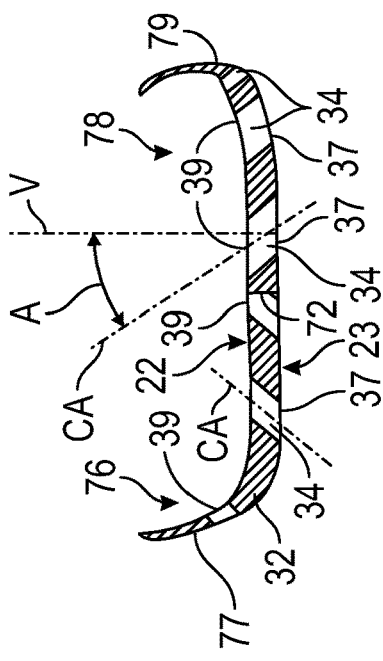
FIG. 14 is a cross-sectional view of the midsole body taken at lines 14-14 in FIG. 2 and inverted relative to FIG. 2, and in an as-molded position with the cleft closed.

FIGS. 9-11 show the midsole body 32 in the molded position with the cleft 72 open. The cleft 72 is shown as having an angle A between vertical V and each of its sidewalls 72A, 72B in the open (as molded) position. The sidewalls 72A, 72B are also indicated in FIG. 8. The angle A may be, for example 40 degrees, so that a total opening between the sidewalls of the cleft 72 is 80 degrees. Accordingly, when the cleft 72 is closed, as shown in FIGS. 12-14, the angled holes 34 will each extend laterally outward at angle A, which is 40 degrees in the embodiment shown. The angle of the holes 34 is best shown in the cross-sectional views of FIGS. 12, 13, 15 and 18. The center axes CA of the holes 34 of the first set 76 angle laterally outward from the proximal surface 22 to the distal surface 23 such that a distal end 37 of each hole 34 of the first set 76 is nearer to the medial periphery 77 than is a proximal end 39 of the hole 34. The center axes CA of the holes 34 of the second set 78 angle laterally outward from the proximal surface 22 to the distal surface 23 such that a distal end 37 of each hole 34 of the second set 78 is nearer to the lateral periphery 79 than is a proximal end 39 of the hole 34. The center axes CA of the holes 34 of the first set 76 are parallel to one another in the open (as-molded) position of the cleft 72 (see FIG. 9), and the center axes CA of the holes 34 of the first set 76 are nonparallel with the center axes CA of the holes 34 of the second set 78 in the closed position of the cleft 72 (see FIG. 12).

As shown in FIGS. 12-14, the first portion 32A of the midsole body 32 is contiguous with the second portion 32B at the proximal surface 22 and at the distal surface 23 when the cleft 72 is closed. In other words, there are no gaps or differences in elevation between the first portion 32A and the second portion 32B at the cleft 72 when the cleft is closed. The cleft 72 may be kept in the closed position by thermally bonding or adhering the sidewalls 72A, 72B to one another. Alternatively, the bonding of an upper at the proximal surface 22 or an outsole at the distal surface 23 may serve to retain the cleft 72 in the closed position.

In embodiments having a connecting web 25, the web 25 may be positioned over midsole body 32 with the cleft 72 in the open position, and the integral proprioceptive elements 36 may be inserted into the holes 34 effectively simultaneously simply by moving the connecting web 25 toward the proximal surface 22 with the proprioceptive elements 36 aligned with the holes 34. The web 25 may be stretchable such that it is pulled transversely to stretch across the cleft 72 during insertion, and retracts to a narrower width corresponding to the narrower width at the proximal surface 22 of the midsole body 32 with the cleft 72 in the closed position. Alternatively or in addition, a portion of the connecting web 25 extending over the cleft 72 may be folded into the cleft 72 prior to closing the cleft 72, such that the web 25 is bonded in the cleft 72. In either instance, the web 25 with integral proprioceptive elements 36 simplifies the insertion process for the proprioceptive elements 36, allowing insertion simultaneously or nearly simultaneously simply by aligning the proprioceptive elements 36 with the holes 34 when the cleft 72 is positioned over the midsole body 32, and then lowering the proprioceptive elements 36 into the holes 34. In instances where the holes 34 and the corresponding proprioceptive elements 36 are a variety of sizes, this saves assembly time and reduces the potential for erroneously inserting the differently-sized proprioceptive elements 36 in the wrong holes 34. In other embodiments, however, where no web or other connecting layer (e.g., sockliner, outsole) for the proprioceptive elements 36 is used, the proprioceptive elements 36 can be individually and separately inserted into the corresponding holes 34, as they will be trapped between the outsole 16 and the upper 18 or other overlying layer in any event once the article of footwear 12 is assembled.

Figure 20:
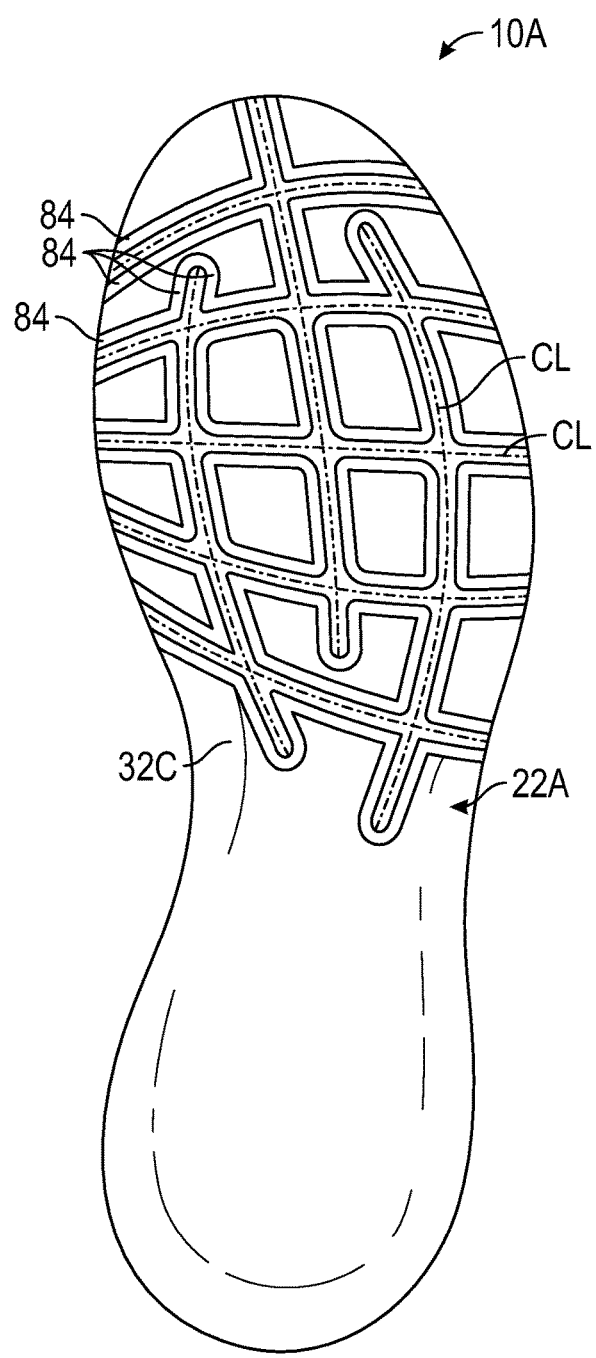
FIG. 20 is a plan view of the sole structure of FIG. 19 including a midsole with internal flex grooves.
Figure 21:
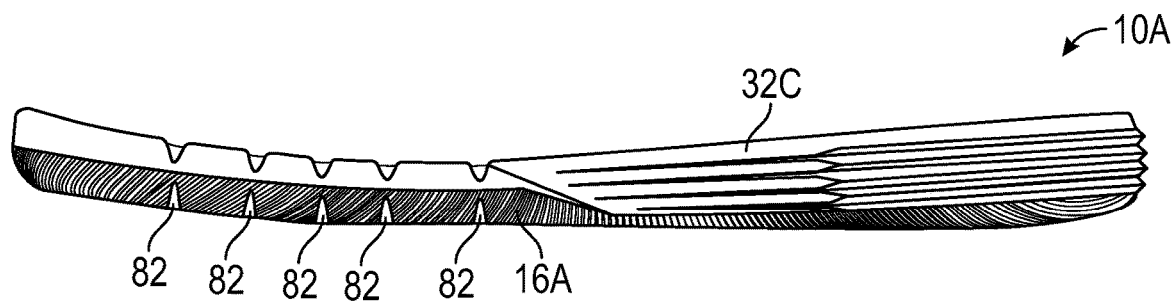
FIG. 21 is a medial side view of the sole structure of FIG. 19.
Figure 22:
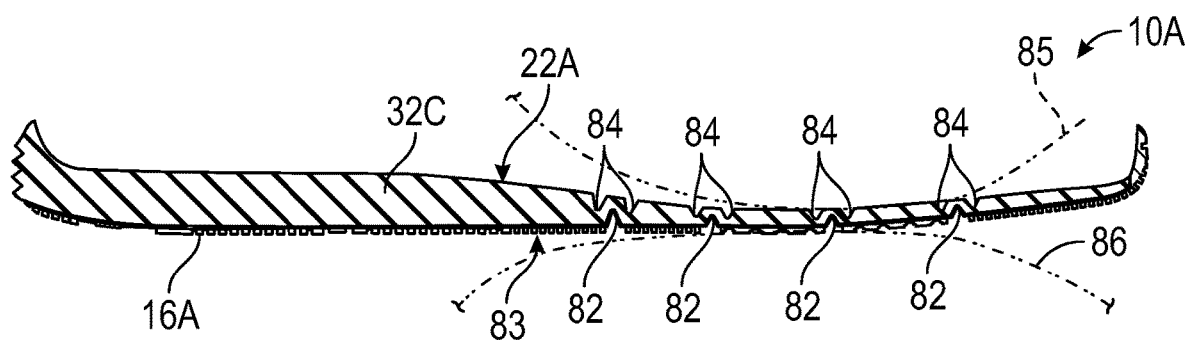
FIG. 22 is a cross-sectional view of the sole structure of FIG. 19 taken at lines 22-22 in FIG. 19 and inverted relative to FIG. 19.

In FIG. 15, the outsole 16 is shown with a proximal surface 80 secured to the distal surface 23 of the midsole body 32. In lieu of outsole 16, an outsole 16A with flex grooves 82 in a distal surface 83 of the outsole 16A may be used, as shown in the sole structure 10A of FIGS. 19, 21, and 22. Only some of the flex grooves 82 are labeled in FIG. 19. The outsole 16A is shown secured to a midsole body 32C that does not show holes with proprioceptive elements, but could instead be secured to the midsole body 32. The flex grooves 82 would extend between adjacent ones of at least some of the proprioceptive elements 36 when secured to midsole body 32. In FIG. 20, the proximal surface 22A of the midsole body 32C is shown with internal flex grooves 84. The internal flex grooves 84 overlie and are aligned with the external flex grooves 82. More specifically, internal flex grooves 84 are arranged in a pattern matching the pattern of the external flex grooves 82 so that the internal flex grooves 84 border either side of centerlines of the external flex grooves 82, as best indicated in FIG. 22. In other words, two internal flex grooves 84 extend parallel to one another, tracking the grooves 82 from above, with a narrow portion of the midsole body 32C between each of the internal flex grooves 84 directly overlying the external flex grooves 82. Accordingly, the internal flex grooves 84 and the external flex grooves 82 allow the midsole body 32C and outsole 16A to function as pleated bellows at the grooves 82, 84 such that the sole structure 10A articulates at the external flex grooves 82 and the internal flex grooves 84 both in dorsiflexion (e.g., along curve 85) and in plantarflexion (e.g., along curve 86) of the sole structure 10A, as best depicted in FIG. 22. Curve 85 represents a degree of articulation at which at least some of the internal flex grooves 84 will close. Curve 86 represents a degree of plantar flexion at which at least some of the external flex grooves 82 will close. The longitudinally-extending flex grooves 82, 84 allow articulation in the transverse direction of the sole structure 10A as well, such as during plantarflexion over a curved ball surface.

Figure 23:
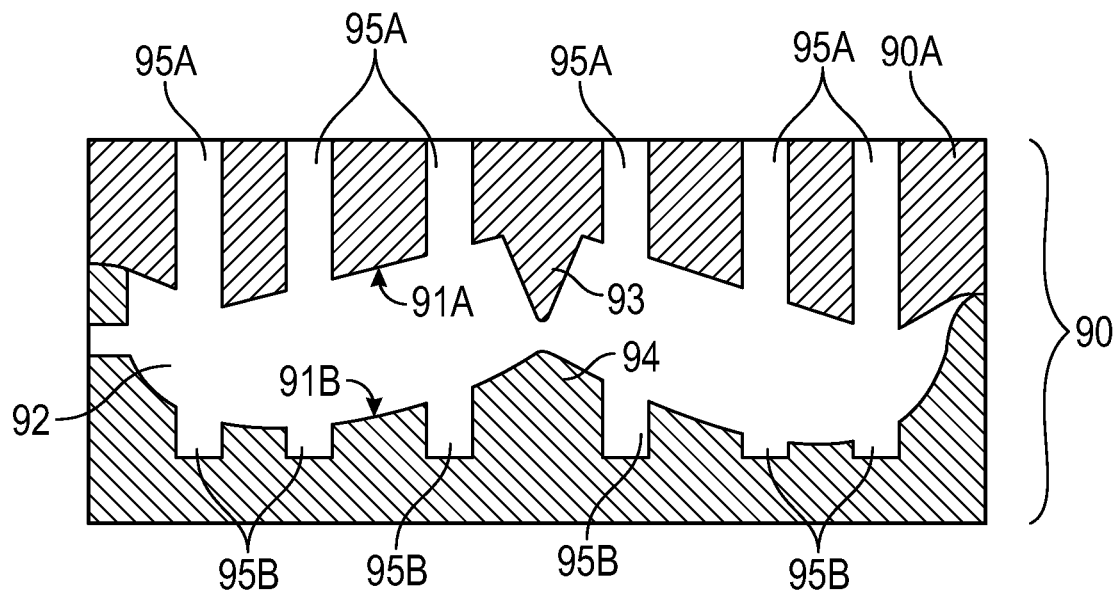
FIG. 23 is a cross-sectional view of a mold for a midsole.
Figure 24:
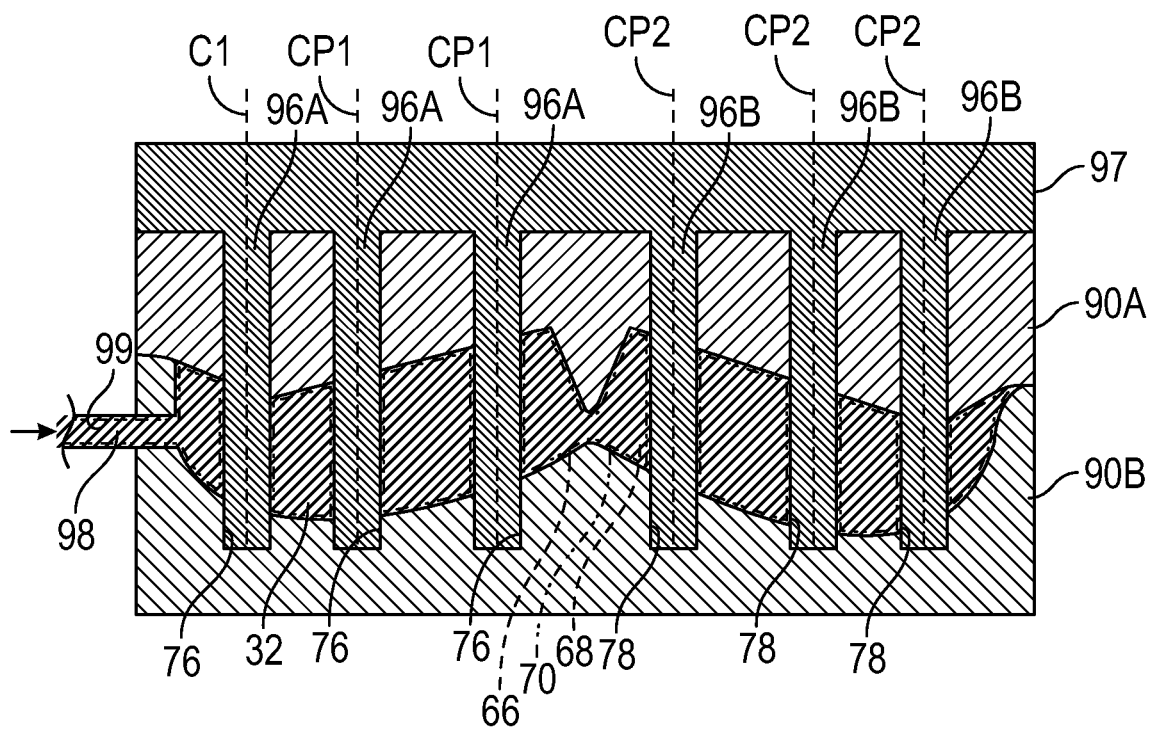
FIG. 24 is a cross-sectional view of the mold of FIG. 23, a mold tool including pins, and with a mold cavity filled with polymeric foam.
Figure 25:
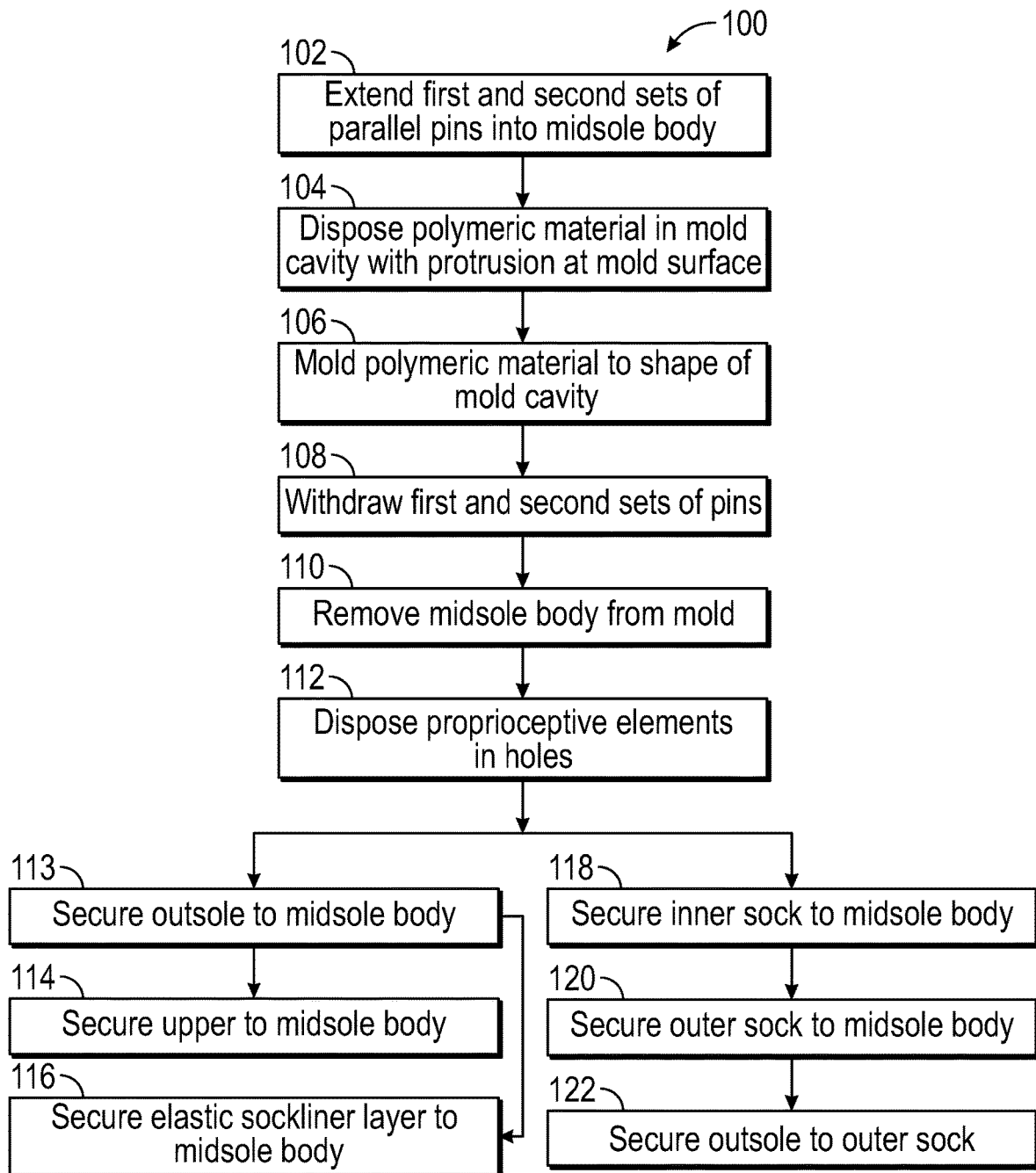
FIG. 25 is a flowchart of a method of manufacturing an article of footwear.

FIGS. 23-24 show a representative mold 90 for manufacturing the midsole body 32. FIG. 25 is a flowchart of a method of manufacturing the midsole body 32 using the mold 90 of FIGS. 23-24. The mold 90 includes an upper mold half 90A and a lower mold half 90B. The upper mold half 90A has an upper mold surface 91A in a mold cavity 92, and the lower mold half 90B has a lower mold surface 91B in the mold cavity 92. The mold halves 90A, 90B are movable toward one another to the closed position shown in FIGS. 23 and 24, in which the mold surfaces 91A, 91B together form a mold cavity 92. The mold halves 90A, 90B are movable away from one another to open the mold cavity 92 (e.g., by moving mold half 90A upward in FIG. 23, moving mold half 90B downward, or both, as will be understood from the present disclosure to those skilled in the art. The upper mold surface 91A includes a protrusion 93 that extends toward the lower mold half 90B. The lower mold half 90B also includes a protrusion 94. Both protrusions 93, 94 run along a longitudinal axis of the mold 90, which is perpendicular to the plane of the cross-section shown. The protrusion 93 forms the cleft 72 shown in the midsole body 32 in FIG. 8, and the protrusion 94 molds the distal surface 23 of the midsole body 32 to the open position. In certain regions, the protrusions 93, 94 may touch. Such regions will correspond to the areas where the cleft 72 extends completely through the midsole body 32, where the medial portion 32A and the lateral portion 32B are completely split and disconnected from one another (e.g., at an area rearward of the heel hinge HH, at an area forward of the forefoot hinge FH, and at an area between the forefoot hinge FH and the heel hinge HH, as described with respect to FIG. 7).

The upper mold half 90A has through-holes 95A, and the lower mold half 90B has blind holes 95B. Alternatively, through-holes 95A may be used in lieu of blind holes 95B. The through-holes and blind holes 95A, 95B are aligned with one another to receive a first set of pins 96A, and a second set of pins 96B, as shown in FIG. 24. The pins 96A, 96B extend from a mold tool 97 that is translatable toward and away from the mold 90. A single mold tool 97 is used. Alternatively, the first and second sets of pins 96A, 96B may be secured to separate mold tools. The pins 96A, 96B and the holes 95A, 95B are arranged in the same pattern (i.e., relative spacing and size), which is identical to the pattern of the holes 34 in the midsole body 32.

FIG. 25 is a flowchart illustrating a method 100 of manufacturing an article of footwear, such as the article of footwear 12. In block 102, the method 100 includes extending a first set of pins 96A into the midsole cavity 92 on a first side of the protrusion 94 (i.e., on the medial side), and a second set of pins 96B into the midsole cavity 92 on a second side of the protrusion 94 (i.e., on the lateral side). The first set of pins 96A forms the first set 76 of holes 34 in the midsole body 32, the second set of pins 96B forms the second set 78 of holes 34 in the midsole body 32, and the protrusion 93 forms the cleft 72 between the first set 76 of holes and the second set 78 of holes, all shown in FIG. 8. Center axes CP1 of the pins of the first set of pins 96A are parallel with center axes CP2 of pins of the second set 96B.

The method 100 includes block 104, disposing polymeric material 98 into a mold cavity 92 of a mold 90 for a midsole body 32. For example, the polymeric material 98 may be introduced through an injection port 99 of the mold 90. The method 100 continues with block 106, molding the polymeric material to the shape of the mold surface, thereby forming a midsole body 32. Molding in block 106 may include compression, vacuum-forming, and/or thermal processing. In other embodiments, blocks 102, 104, and 106 can be performed in a different order than as described.

In block 108, the method 100 includes withdrawing the first set of pins 96A and the second set of pins 96B from the midsole body 32. Because the pins 96A, 96B are parallel, the same mold tool 97 can be used to form the first and second sets 76, 78 of holes 34 simultaneously. Additionally, because the holes 34 are formed during molding, rather than during a secondary process following molding, the skin 66 borders the less dense, interior portion 68 of the midsole body 32, providing compression resistance to forces along the central axes of the holes 34, as discussed with respect to FIG. 15.

In block 110, the method 100 includes removing the midsole body 32 from the mold 90. As described with respect to FIGS. 9, 12, 15 and 18, center axes CA of the holes 34 of the first set 76 of holes are nonparallel with center axes CA of the holes 34 of the second set 78 of holes when the cleft 72 is closed.

In block 112, the method 100 may include disposing a first plurality of proprioceptive elements 36 in at least some holes 34 of the first set 76 and a second plurality of proprioceptive elements 36 in at least some holes 34 of the second set 78. In embodiments having a connecting web 25, this may including placing the connecting web 25 above the midsole body 32, and aligning the proprioceptive elements 36 with the holes 34. In embodiments in which the proprioceptive elements 36 are integrally formed with another layer, such as a sockliner or an outsole, block 112 will include placing the layer above (e.g., if the layer is a sockliner) or below (e.g., if the layer is an outsole) the midsole body 32, and aligning the proprioceptive elements 36 with the holes 34. In embodiments in which each of the proprioceptive elements 36 is disconnected from each of the other proprioceptive elements 36, block 112 will include separately aligning and disposing each proprioceptive element 36 into a respective hole 34 of the correct size.

In one embodiment, a first set of proprioceptive elements 36 are disposed in the forefoot region 50, and a second set of proprioceptive elements 36 are disposed in the heel region 54. The first plurality of proprioceptive elements may have a first density, and the second plurality of proprioceptive elements may have a second density different than the first density. Additionally, the midsole body 32 may have a density at the skin 66, and a different density at the interior portion 68, both of which are different than the densities of the proprioceptive elements 36. The proprioceptive elements 36 of the first set 76 may be a polymeric foam that has a density greater than or lesser than the midsole body 32. The proprioceptive elements 36 of the second set 78 may be silicone.

Figure 61:
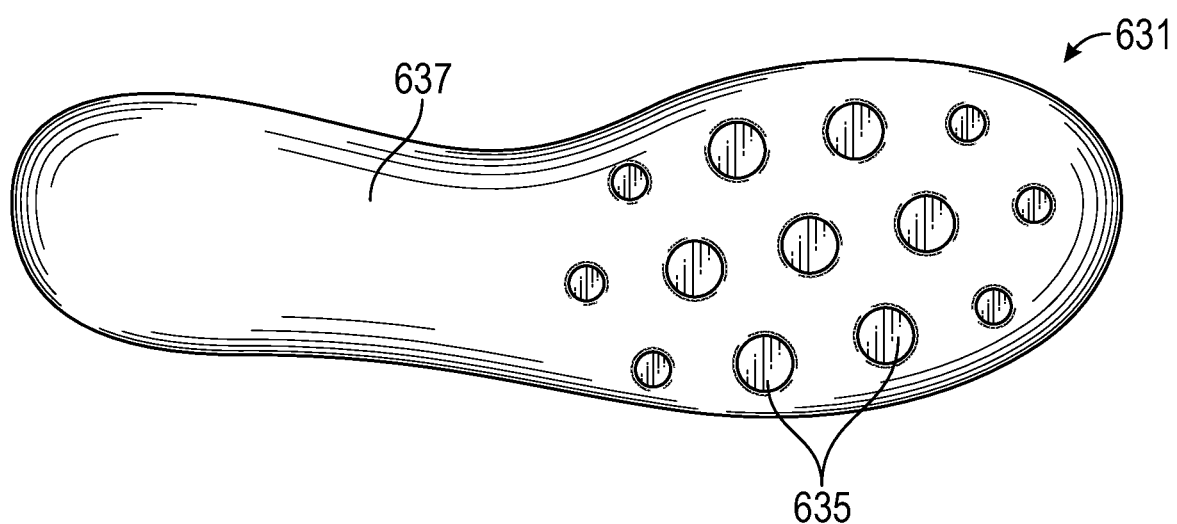
FIG. 61 is a top view of the sockliner of FIG. 59.

Next, the method 100 may include block 113, securing an outsole, such as outsole 16 or 16A described herein, to the distal surface 23 of the midsole body 32. In some embodiments, securing an outsole may occur later in the method 100, such as after block 118 described herein. If block 113 is performed following block 112, then the method 100 moves to either of blocks 114 or 116. Block 114 includes securing an upper 18, such as a sock, to the proximal surface 22 of the midsole body 32. In other embodiments, the method 100 includes block 116, securing an elastic sockliner layer to the proximal surface 22 of the midsole body 32. The elastic sockliner layer may be, for example, elastic sockliner layer 635 as described with respect to FIGS. 59-61, with the elastic sockliner layer spanning across the first set 76 of holes 34 and the second set 78 of holes 34. In the embodiment of FIG. 15, a sockliner is not required, however, as the midsole body 32 has a thickness sufficient to also serve as a sockliner.

Figure 37:
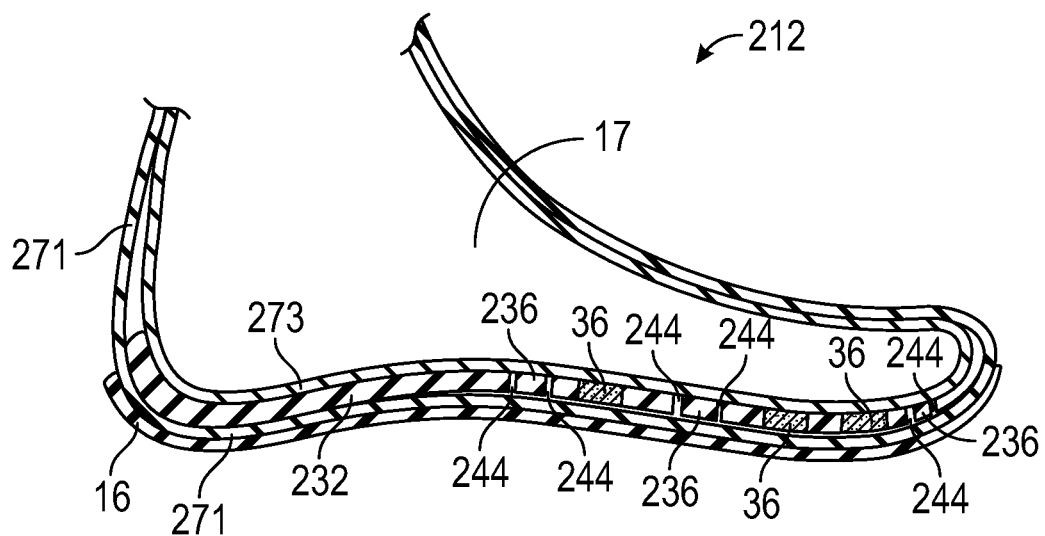
FIG. 37 is a schematic cross-sectional and fragmentary view of the article of footwear of FIG. 36.
Figure 38:
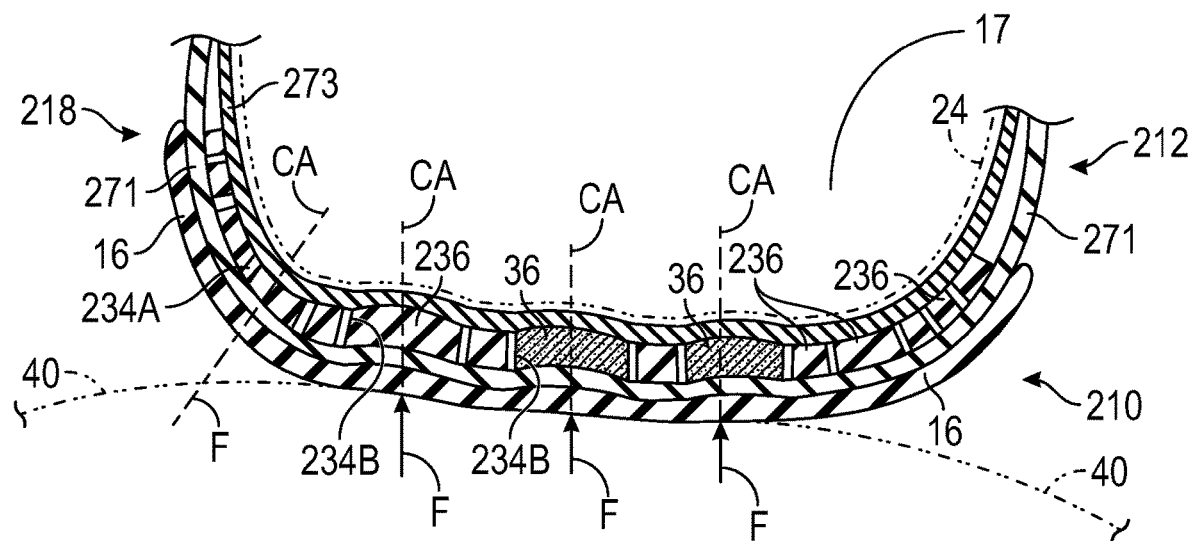
FIG. 38 is a schematic cross-sectional and fragmentary view of the article of footwear of FIG. 36 and an object in phantom providing forces on some of the proprioceptive elements.
Figure 39:
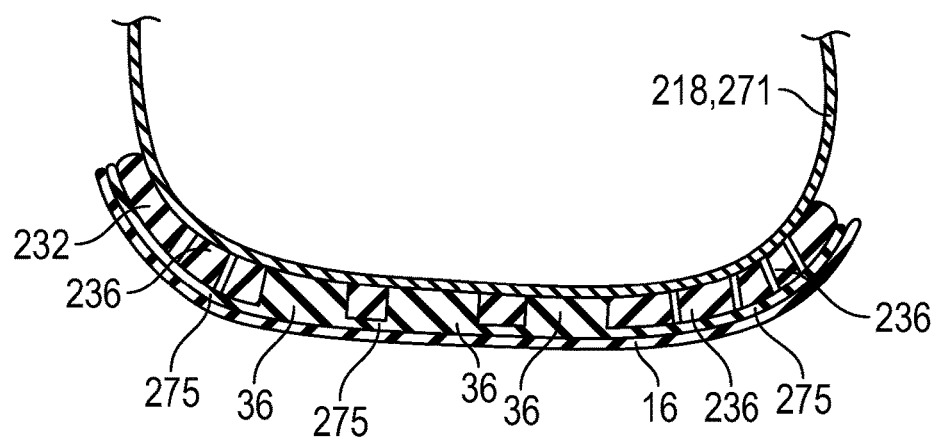
FIG. 39 is a schematic cross-sectional and fragmentary view of an article of footwear with an alternative sole structure.

In still other embodiments, the method 100 moves from block 112 to block 118, in which a distal surface of an inner sock is secured to the proximal surface 22 of the midsole body 32, and then in block 120, an outer sock is pulled over the midsole body 32 and secured to the distal surface 23 of the midsole body 32 such that the midsole body 32 is disposed inside of the outer sock, and between the inner sock and the outer sock. For example, although FIGS. 37-39 are illustrated with midsole body 232, a sole structure including midsole body 32 can include an inner sock and an outer sock in a like manner. In such an embodiment, following block 120, the method 100 continues in block 122, securing an outsole 16 to the distal surface of the outer sock, as shown and described with respect to FIG. 37.

Figure 26:
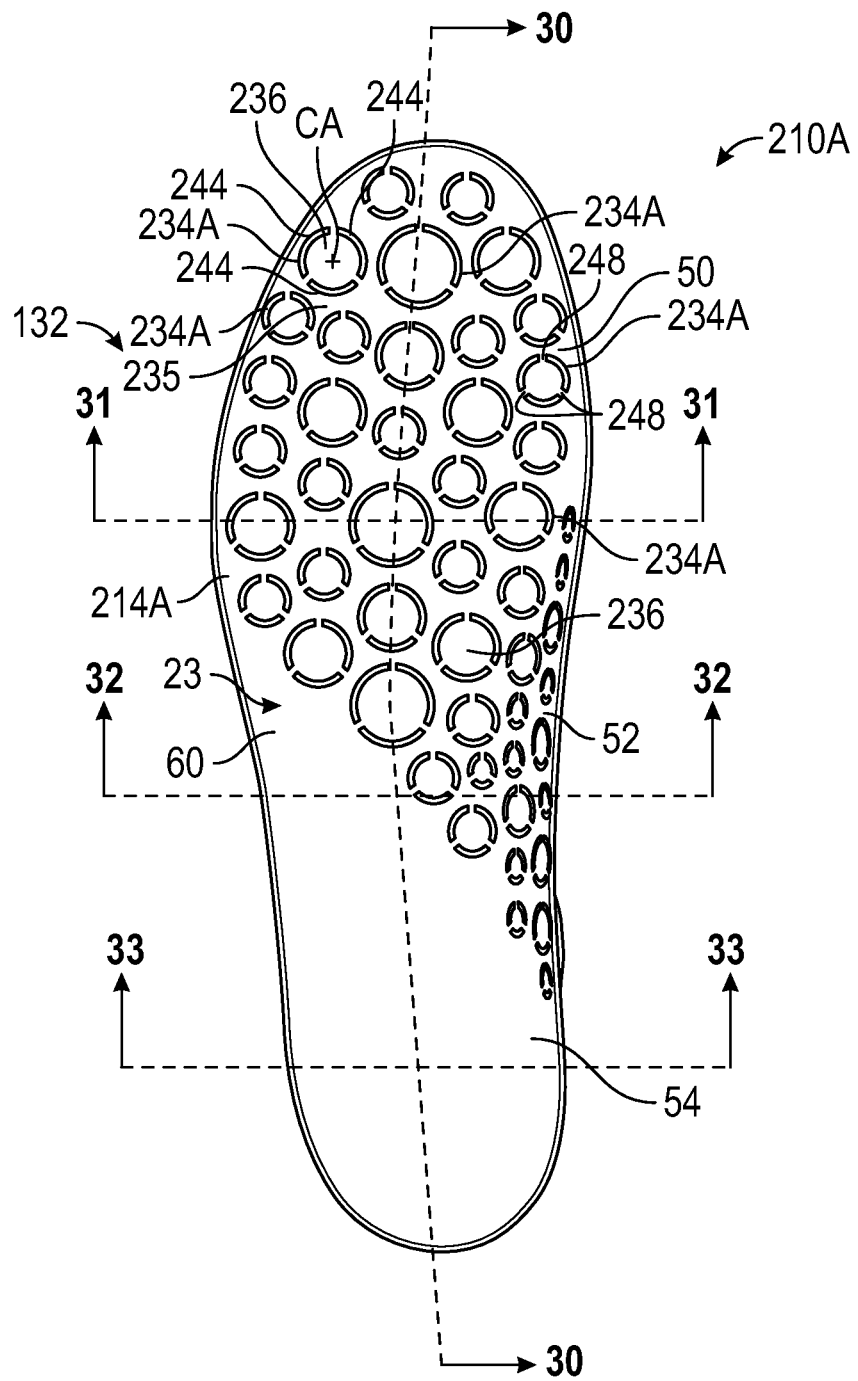
FIG. 26 is a bottom view of a sole structure for an article of footwear including a midsole having a midsole body and proprioceptive elements.

FIG. 26 shows another embodiment of a sole structure 210A having a midsole 214A for an article of footwear 212. The sole structure 210A includes a midsole 214A with a midsole body 232. The midsole 214A may be used in the article of footwear 212 shown in FIGS. 37-39 in lieu of midsole 214.

Figure 34:
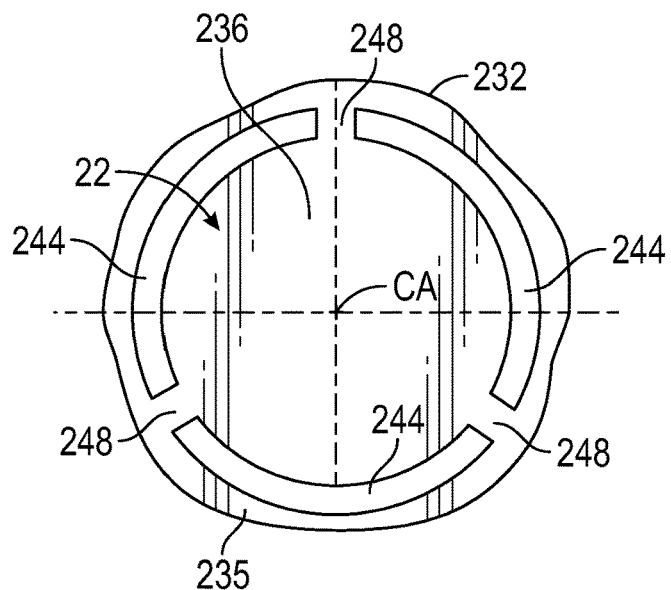
FIG. 34 is a fragmentary plan view of a portion of the midsole body of FIG. 26 showing perforations.
Figure 35:
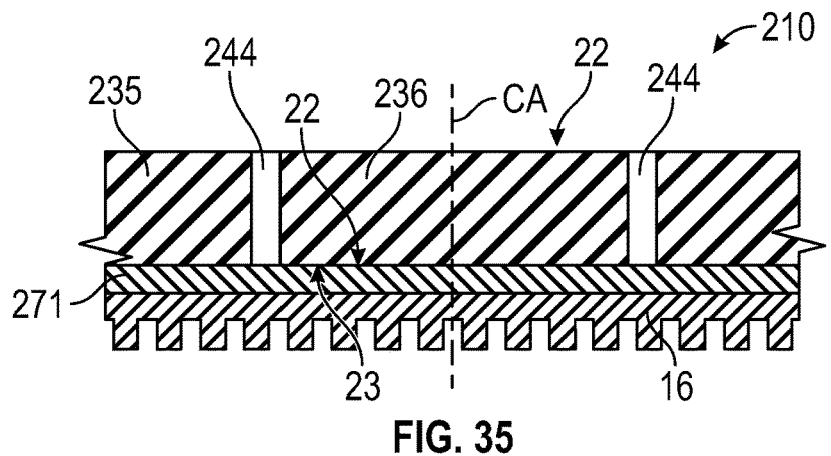
FIG. 35 is a fragmentary cross-sectional view of an article of footwear showing a portion of the midsole body of FIG. 31, and including an underlying sock and an outsole.

The midsole body 232 has perforations 244 that extend from the proximal surface 22 to the distal surface 23. In FIG. 26, the distal surface 23 is shown, but it is apparent that the perforations 244 extend entirely through the thickness of the midsole body 232 from the proximal surface 22 to the distal surface 23. In the embodiment shown, the perforations 244 define perforated shapes that are circular. The perforated shapes are integral portions 236 of the midsole body 232 and are surrounded by three equally-spaced perforations 244. The integral portions 236 serve as proprioceptive elements 236. The three equally-spaced perforations 244 define a perforated hole 234A. As best shown in FIG. 34, arms 248 span between the main portion 235 of the midsole body 232 (i.e., the portion surrounding the perforations 244) to secure the integral proprioceptive element 236 within the perforated hole 234A. A plurality of proprioceptive elements 236 that are disposed in the plurality of perforated holes 234A are thus integral portions of the midsole body 232 surrounding the perforations 244. The perforations 244 and integral proprioceptive elements 236 may be formed during molding of the midsole body 232, or the midsole body 232 may be perforated in a secondary process, after molding.

The arms 248 enable some degree of translating movement of the proprioceptive element 236 relative to the surrounding main portion 235 of the midsole body 232 along the central axis CA of the proprioceptive element 236 when a force is applied at a distal end 38 of the proprioceptive element 236 toward the proximal surface 22. The proprioceptive elements 236 can thus provide tactile feedback to a wearer, as described with respect to proprioceptive elements 36.

Figure 27:
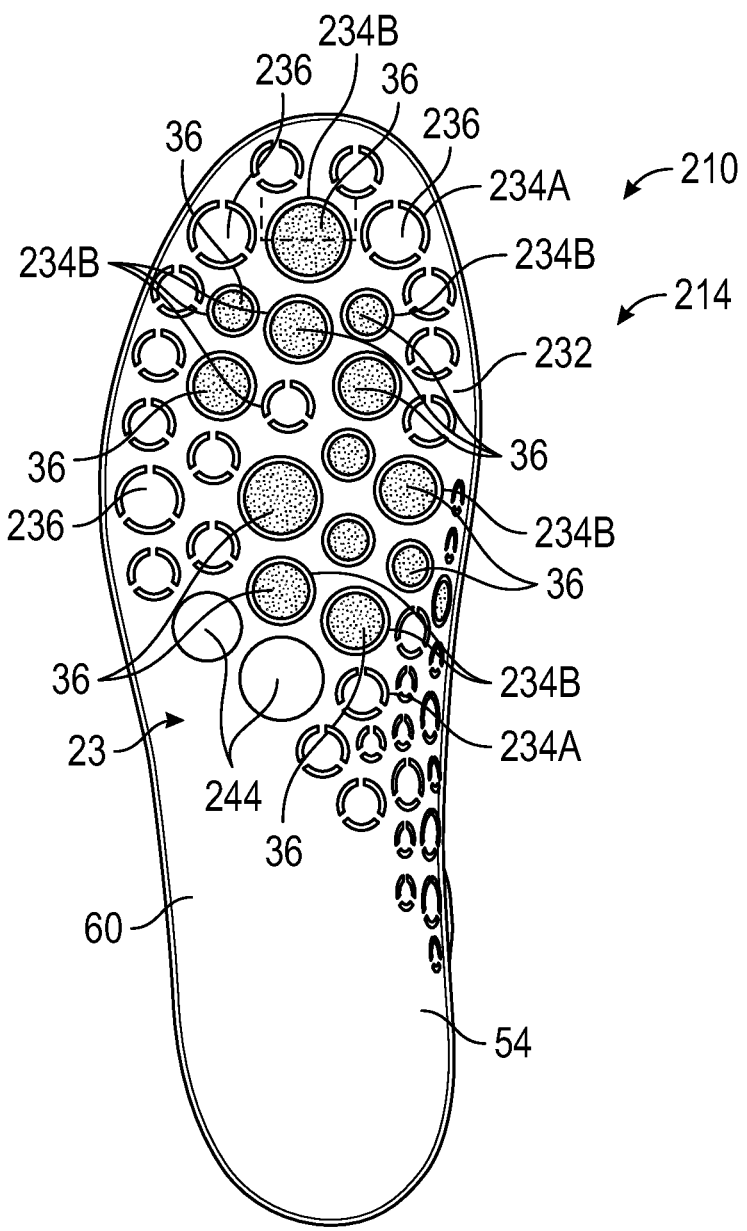
FIG. 27 is a bottom view of an alternative embodiment of a sole structure for an article of footwear, including the midsole body of FIG. 26.

In some embodiments, such as is shown in FIG. 27, some or all of the integral proprioceptive elements 236 are punched out. Stated differently, multiple ones of the perforated shapes (i.e., the integral proprioceptive elements 236) are punched out at the perforations 244 such that a plurality of punched through-holes 234B extend from the proximal surface 22 to the distal surface 23. The midsole body 232 with punched-out holes 234B is referred to as midsole 214 and is included in sole structure 210 of FIGS. 37-39. In FIGS. 26-34 an outsole 16 is removed for clarity in viewing the midsole 214. The midsole body 232, midsole 214, and sole structure 210 have many of the same features as midsole body 32, midsole 14, and sole structure 10, and such features are referred to with like reference numbers and are as described with respect to sole structure 10. Each of the punched through-holes 234B can then have a proprioceptive element 36 inserted into the through-hole 234B, in the same manner as described with respect to proprioceptive elements 36 in through-holes 34 of FIG. 1. The midsole body 232 may have a first density, and the inserted proprioceptive elements 36 may have a second density different than the first density, as described with respect to the midsole body 32 and sole structure 10. Different proprioceptive elements 36 of different densities can be used, and disposed in different regions of the midsole 232.

FIG. 27 shows many punched through-holes 234B with proprioceptive elements 36 disposed therein. FIG. 27 also shows that some of the integral proprioceptive elements 236 are not punched out. Additionally, FIG. 27 shows two of the punched through-holes 234B without any proprioceptive elements 36 therein. In some embodiments, these or other punched through-holes 234B can be left empty (i.e., punched out without a proprioceptive element 36 disposed therein in a secondary process). Accordingly, the midsole 214 may include a combination of: (i) integral proprioceptive elements 236 in perforated holes 234A formed during molding, three-dimensional printing, or otherwise forming of the midsole 214 or perforated therein during a secondary process; (ii) proprioceptive elements 36 disposed in punched through-holes 234B in a secondary process; and (iii) empty, punched through-holes 234B.

Figure 28:
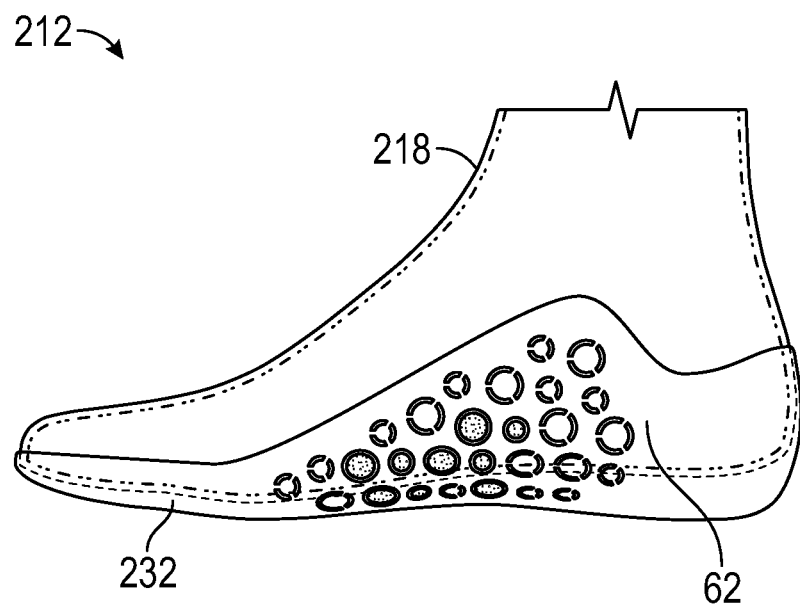
FIG. 28 is a medial view of an article of footwear with the sole structure of FIG. 26 and including an upper.
Figure 29:
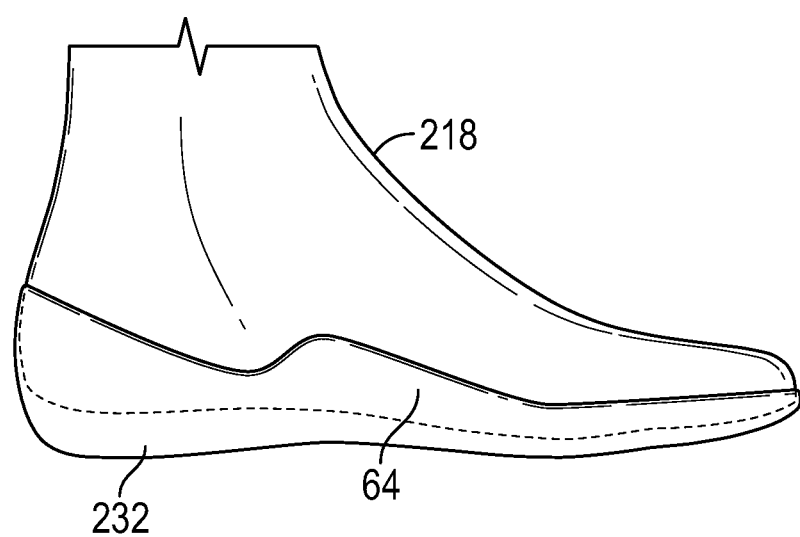
FIG. 29 is a lateral view of the article of footwear of FIG. 28.

As is evident in the embodiment of FIGS. 26-28, the perforated holes 234A are disposed in a bottom portion 60, and in a medial sidewall portion 62 of the midsole body 232, in the forefoot region 50, and the midfoot region 52. The heel region 54 and the lateral sidewall portion 64 in the embodiment shown in FIGS. 26-29 generally have no perforated holes 234A of other holes, but in other embodiments, perforated holes 234A could be disposed in one or both of these portions as well.

At least some of the perforated holes 234A have different diameters, as shown in FIG. 26. The integral proprioceptive elements 236 are discoid, as best shown in FIG. 34. The proprioceptive elements 36 are also discoid in the embodiment of FIG. 27. The thickness of the midsole body 232 is less than midsole body 32, so the proprioceptive elements 36 are less elongated than those in midsole 14 when disposed in the punched through-holes 234 of midsole 214.

Figure 30:
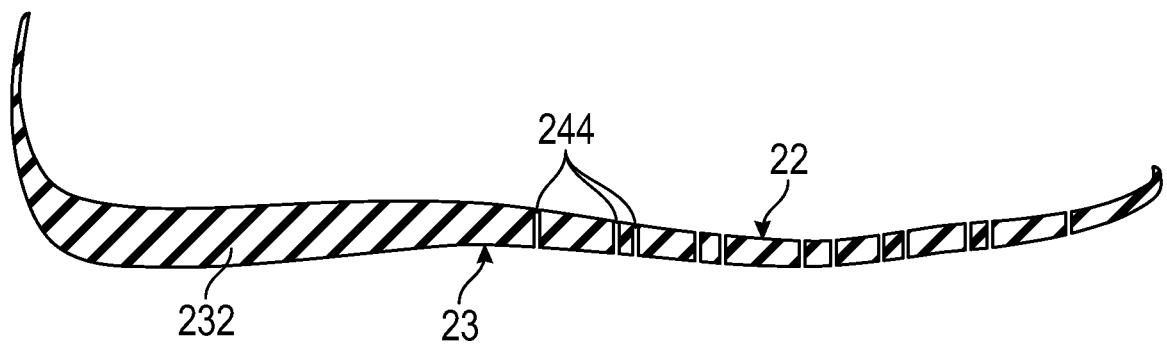
FIG. 30 is a cross-sectional view of the article of footwear of FIG. 26 taken at lines 30-30 in FIG. 26 and inverted relative to FIG. 26.
Figure 31:
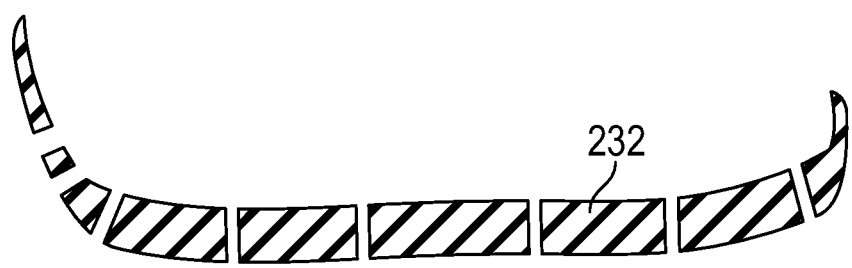
FIG. 31 is a cross-sectional view of the article of footwear of FIG. 26 taken at lines 31-31 in FIG. 26 and inverted relative to FIG. 26.
Figure 32:
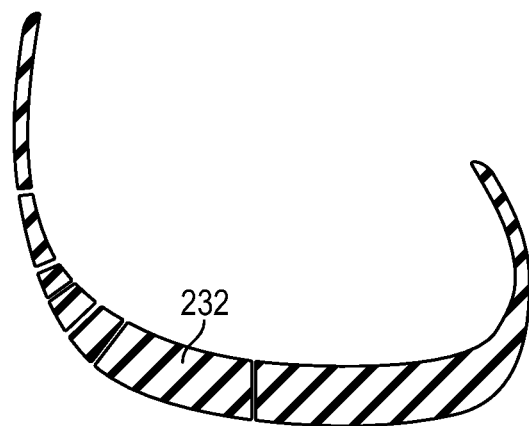
FIG. 32 is a cross-sectional view of the article of footwear of FIG. 26 taken at lines 32-32 in FIG. 26 and inverted relative to FIG. 26.
Figure 33:
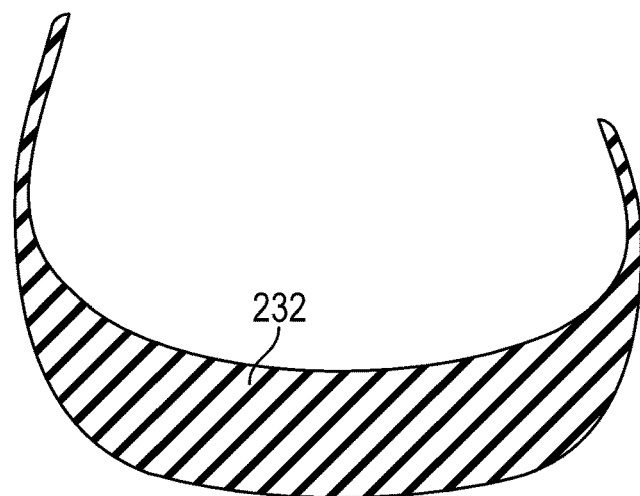
FIG. 33 is a cross-sectional view of the article of footwear of FIG. 26 taken at lines 33-33 in FIG. 26 and inverted relative to FIG. 26.

FIG. 30 shows the midsole body 232 taken at lines 30-30 in FIG. 26. FIGS. 31, 32, and 33 are cross-sectional views of the midsole body 232 of FIG. 26. FIG. 34 is a plan view of the proximal surface 22 of the midsole body 232 at one of the perforated holes 234A.

Figure 36:
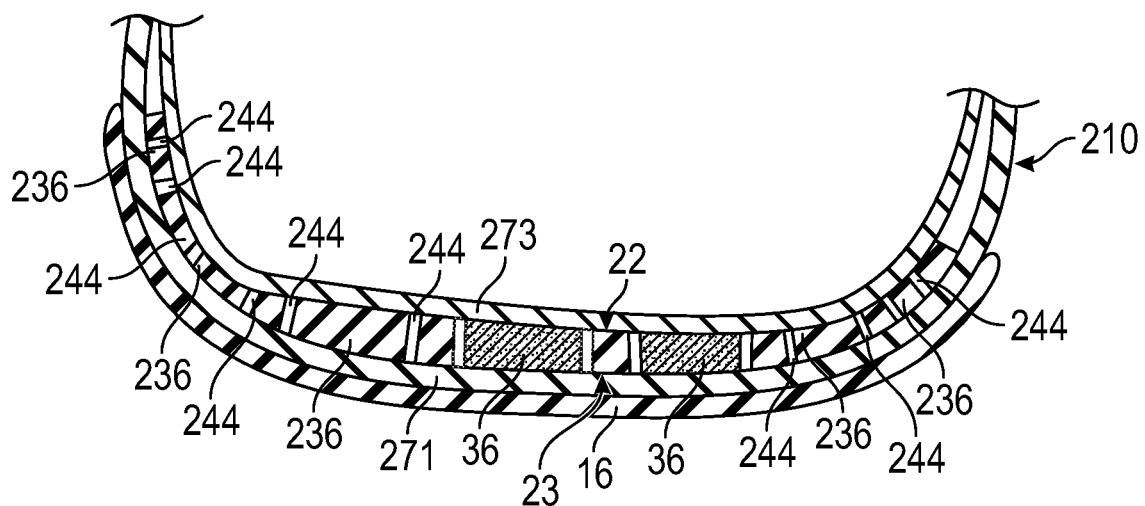
FIG. 36 is a cross-sectional and fragmentary view of an article of footwear including the midsole of FIG. 27, an inner sock, an outer sock, and an outsole.

FIG. 36 shows a fragmentary portion of the sole structure 210 including the midsole body 232, with an upper 218 that includes an outer sock 271 secured to the distal surface 23. FIG. 36 shows the sole structure 210 such as when unloaded (e.g., not subjected to the forces of controlling a ball). FIG. 37 is a longitudinal cross-sectional view. An outsole 16 is secured to the distal surface of the outer sock 271. The distal surface of an inner sock 273 may be secured at the proximal surface 22 of the midsole body 232, as shown in FIG. 36, or a relatively thin, elastic sockliner layer, such as a four-way stretch knit material elastic layer 635 shown in FIG. 59, may be secured so that it overlies the holes 234A, 234B and the proprioceptive elements 236, 36. In either embodiment, the inner sock 273 or the elastic sockliner layer 635 is stretched by the translating proprioceptive elements 36, 236 toward the foot-receiving cavity 17, such as shown and described in FIG. 38 when subjected to forces along their central axes CA.

The inner sock 273 may be secured first by placing the inner sock 273 on a last, and then securing the midsole 214, including the midsole body 232 and the proprioceptive elements 236 to the inner sock 273. The outer sock 271 is then pulled over the inner sock 273 and midsole 214, and the proximal surface of the outer sock 271 is secured to the distal surface 23. The midsole body 232 is disposed inside of the outer sock 271, and between the inner sock 273 and the outer sock 271.

FIG. 38 shows forces F due to a ball 40 on certain ones of the proprioceptive elements 36, 236, causing these proprioceptive elements 36, 236 to be "active" and translate relative to the midsole body 232 along the central axis CA of the respective holes 234B, 234A, while inactive ones of the proprioceptive elements 36, 236 do not translate in this manner. The active proprioceptive elements 36, 236 protrude further at the proximal surface 22 than when not under loading, and thus provide tactile feedback of ball position to the foot 24 of the wearer. The relatively thin and flexible outsole 16, outer sock 271, and inner sock 273 do not interfere with the ability of the proprioceptive elements 36, 236 to provide feedback in this manner.

In an alternative embodiment in FIG. 39, only a single sock layer 271 is used, and the proprioceptive elements 36 are integral with a sheet or connecting web 275, similar to connecting web 25. The outsole 16 is secured to the webbing 275.

Figure 19:
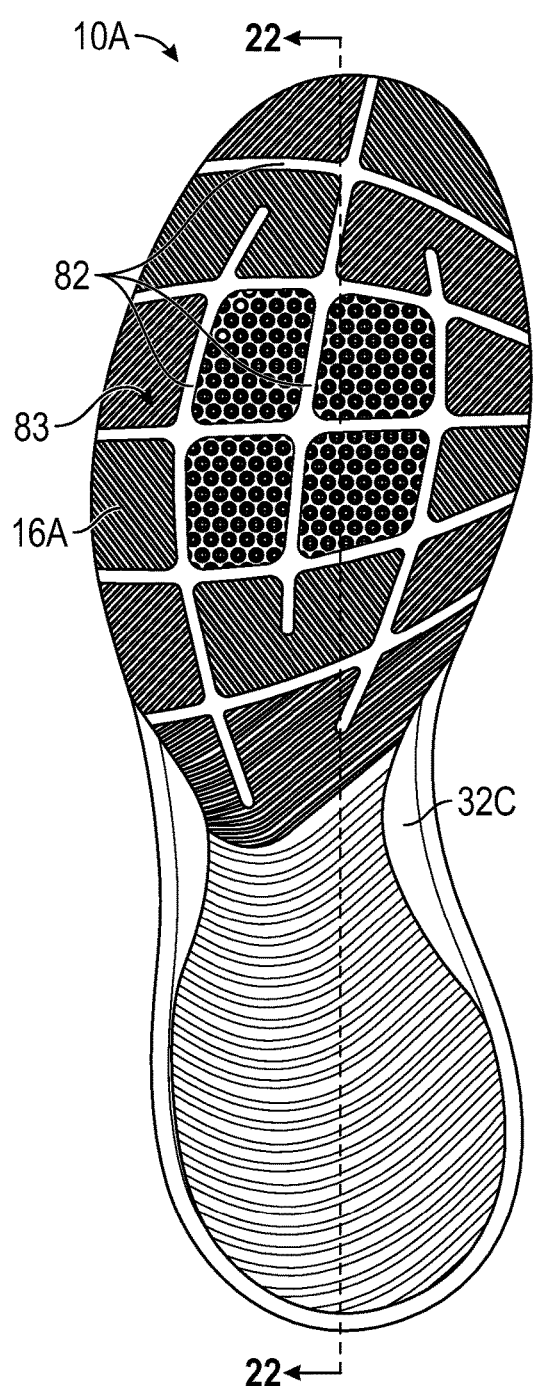
FIG. 19 is a bottom view of a sole structure for an article of footwear including an outsole with external flex grooves.

As an alternative to outsole 16, the outsole 16A of FIG. 19 could be used with the midsole body 232, and the midsole body 232 could have internal flex grooves 84 at the proximal surface 22 (similarly as described with respect to midsole body 32C of FIG. 20) to enhance articulation of the sole structure 210 both in dorsiflexion and plantarflexion.

Figure 40:
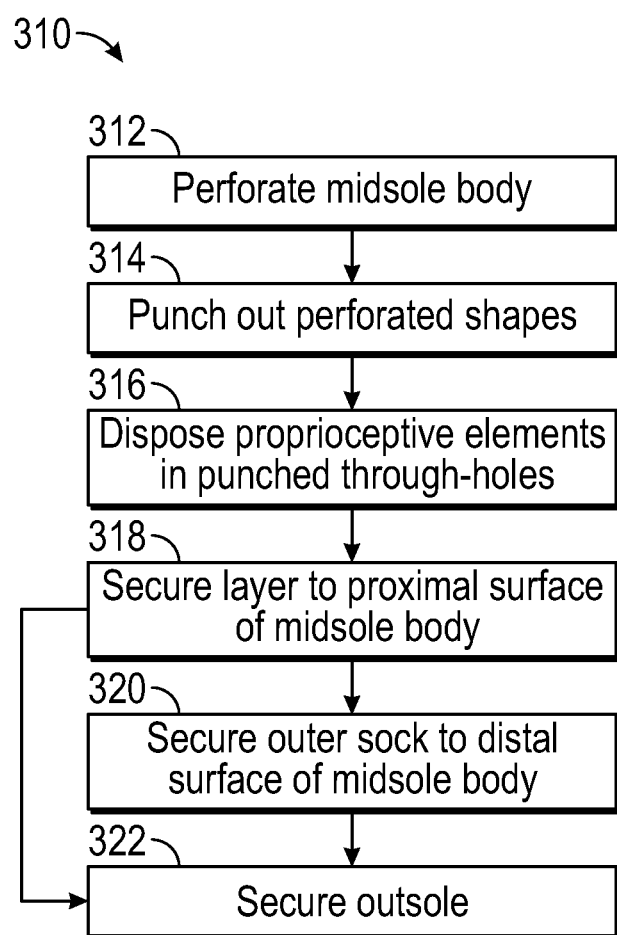
FIG. 40 is a flowchart of a method of manufacturing an article of footwear.

FIG. 40 is a flowchart of a method 310 of manufacturing an article of footwear, such as article of footwear 212 and may apply to sole structure 210, 210A. The method 310 begins with block 312, perforating a midsole body 232 such that perforations 244 define a plurality of perforated shapes and extend through the midsole body 232 from a proximal surface 22 to a distal surface 23, creating perforated holes 234A. Perforating the midsole body 232 may be done during molding of the midsole body 232, in which case block 312 is a molding process. Alternatively, the midsole body 232 may be 3D printed, with the perforations created during the printing process by controlled material deposition. In another alternative, perforating the midsole body 232 may be a secondary process, in which case a molding process occurs prior to block 312.

The method 310 then proceeds with block 314, punching out multiple ones of the perforated shapes at the perforations 244 such that a plurality of punched through-holes 234B extend from the proximal surface 22 to the distal surface 23. Next, block 316 includes disposing proprioceptive elements 36 in one or more of the punched through-holes 234B, each proprioceptive element 36 disposed in a different one of the punched through-holes. The proprioceptive elements 36 may have a density different than a density of the midsole body 232. In some embodiments, such as when manufacturing an article of footwear including sole structure 210A, blocks 314 and 316 are omitted, so that the midsole body 232 includes only the perforated openings 234A, and the integral proprioceptive elements 236 are the only proprioceptive elements in the midsole body 232. In some embodiments, block 314 occurs, but block 316 is omitted, so that all of the punched through-holes 234B remain empty.

In some embodiments, the punched through-holes 234B include a first set of punched through-holes in a forefoot region 50 of the midsole body 232, and a second set of punched through-holes in a heel region 54 of the midsole body 232. The punched through-holes are not shown in the heel region in FIG. 24, but their placement in the heel region 54 will be readily understood by a person skilled in the art in light of the present disclosure. In such an embodiment, at least some of the proprioceptive elements 36 disposed in the first set of punched through-holes 234B have a different density than at least some of the proprioceptive elements 36 disposed in the second set of punched through-holes 234B. For example, the proprioceptive elements 36 in the forefoot region 50 may be a foam that has a greater or lesser density than the foam of the midsole body 232, and the proprioceptive elements 36 in the heel region 54 may be silicon proprioceptive elements 36 for cushioning rather than or in addition to proprioception.

The method 310 then proceeds to block 318, securing a component layer to the proximal surface 22 of the midsole body 232. For example, an elastic sockliner layer 635 such as in FIG. 61 or a sock 273 (which may be an inner sock or a single sock used without an outer sock) may be secured to the proximal surface 22 of the midsole body 232, spanning across the punched through-holes 234B and the perforated holes 234A.

In embodiments having an inner sock 273 and an outer sock 271, the method 310 proceeds to block 320, securing an outer sock 271 to the distal surface 23 of the midsole body 232 such that the midsole body 232 is disposed inside of the outer sock 271, and between the inner sock 273 and the outer sock 271.

Next, the method 310 proceeds to block 322, securing an outsole 16 or 16A to the distal surface 23 of the midsole body 232. In embodiments that do not include an outer sock 271 or other layer between the midsole body 232 and the outsole, the method 310 may include completing block 322 prior to block 318 so that the sole structure 210 is complete prior to securing the sockliner layer, the sock 271, or other upper component to the midsole body 232.

FIGS. 41-47 show another embodiment of a sole structure 410 for an article of footwear. The sole structure 410 includes a midsole 414 with a midsole body 432 and proprioceptive elements 436. The sole structure 410, midsole 414, midsole body 432, and proprioceptive elements 436 have many of the same features as described with respect to sole structure 10 and corresponding components thereof, and such features are referred to with like reference numbers and are as described with respect to sole structure 10.

Figure 43:
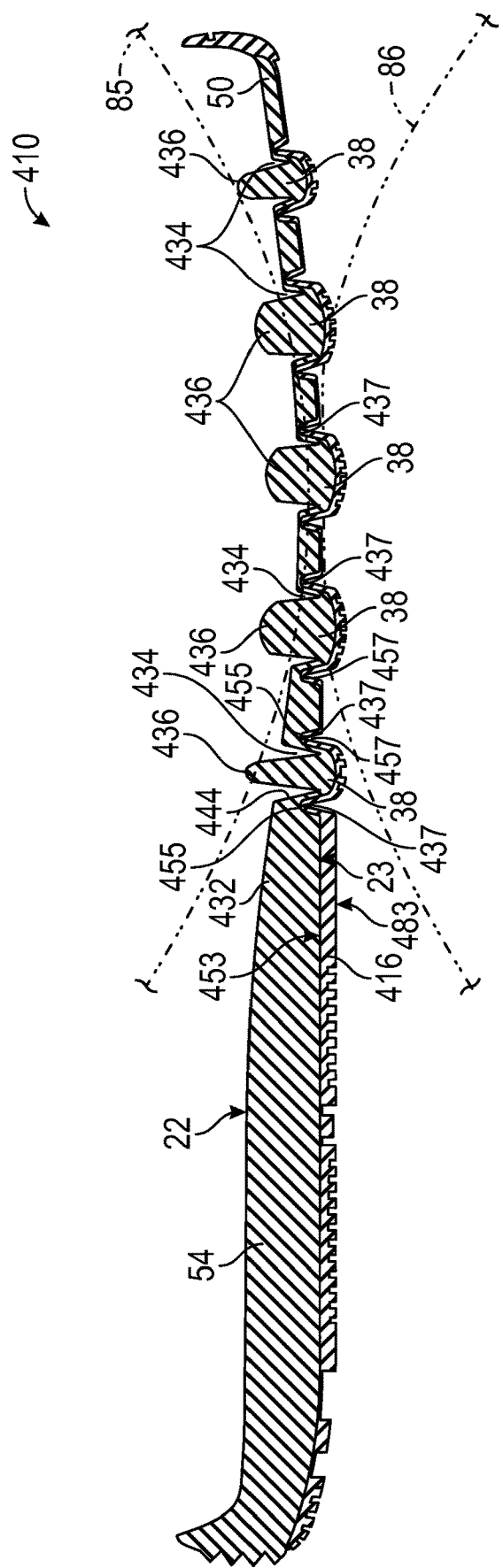
FIG. 43 is a cross-sectional view of the sole structure of FIG. 41 taken at lines 43-43 in FIG. 41.
Figure 44:
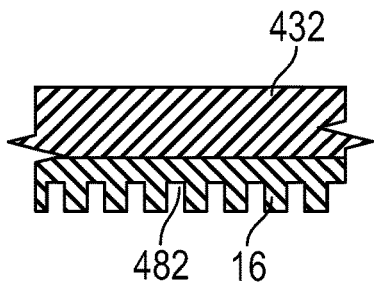
FIG. 44 is a fragmentary cross-sectional view of the sole structure of FIG. 42 taken at lines 44-44 in FIG. 42 and inverted relative to FIG. 42.

The midsole body 432 has a proximal surface 22 and a distal surface 23 indicated in FIG. 43. The midsole body 432 has holes 434 that open at the proximal surface 22. In the embodiment shown, the holes 434 are in the forefoot region 50 and the midfoot region 52 at the bottom portion 60 of the midsole 414. In other embodiments, the holes 434 could also be disposed in a heel region 54, in medial or lateral sidewall portions, or both. A plurality of proprioceptive elements 436 are integrally secured to the midsole body 432. In fact, the midsole body 432 and the proprioceptive elements 436 are a single, unitary component molded integrally with one another. Some of the proprioceptive elements 436 are generally cylindrical with rounded ends, and others are frustoconical with rounded ends.

Figure 41:
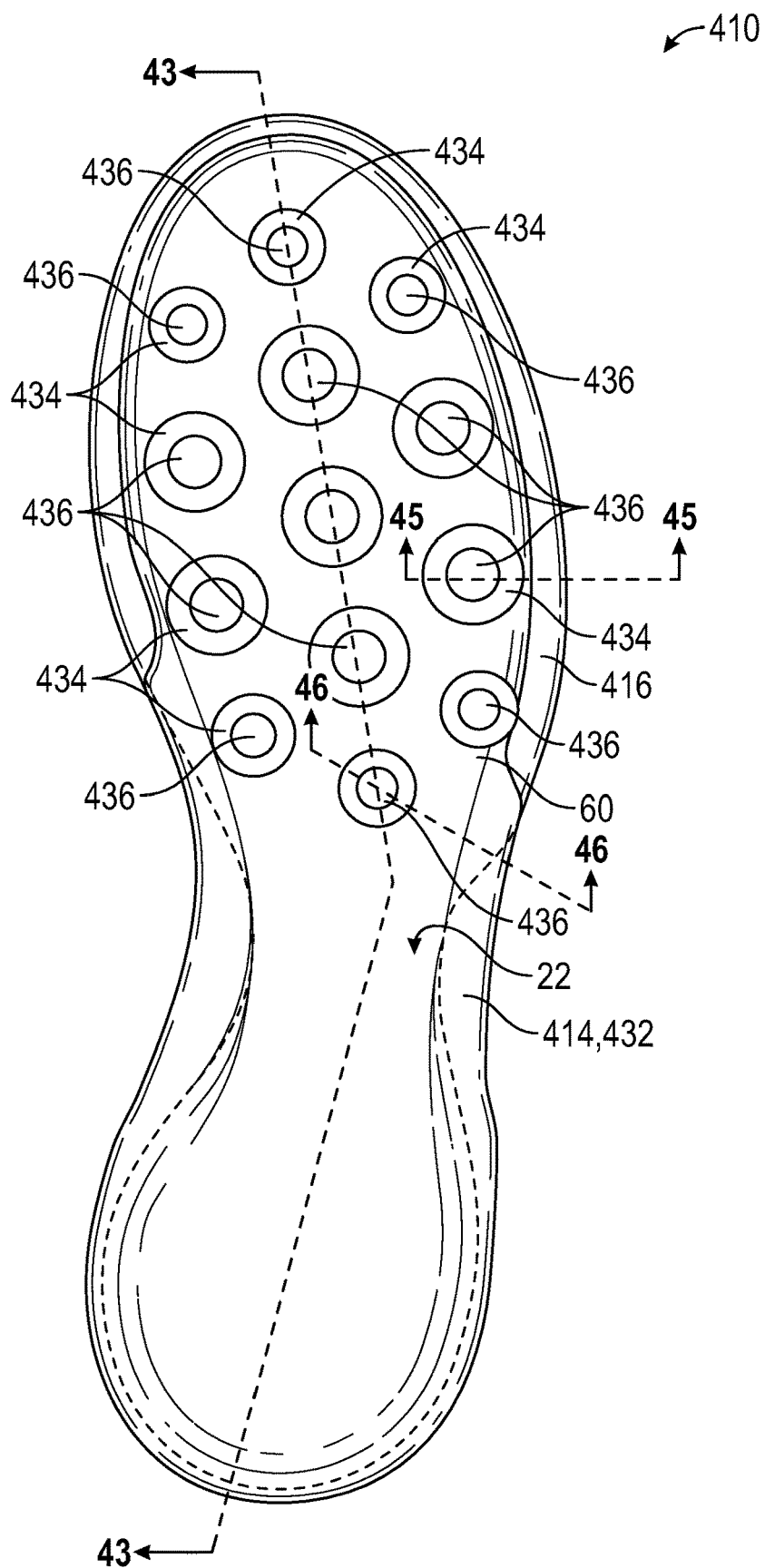
FIG. 41 is a plan view of an alternative embodiment of a sole structure for an article of footwear.

The holes 434 are not through-holes, but instead are annular recesses in the proximal surface 22 that surround the proprioceptive elements 436, as indicated in FIGS. 41 and 43. The holes 434 have different diameters, as is apparent in FIG. 41. The holes 434 are configured such that the proprioceptive elements 436 each have a height greater than a depth of the annular recesses at the proximal surface 22, as shown with respect to proprioceptive elements 436 having height H and annular recesses 434 having a depth D in FIG. 45. Each proprioceptive element 436 is disposed in a different one of the holes 434, and is partially surrounded by an interior wall 444 of the hole 434 when the sole structure is in the relatively unflexed position of FIG. 43, without loading. The holes 434 at the proximal surface 22 may have different depths D, and the proprioceptive elements 436 may have different heights H, but in the midsole 432, the height H of the proprioceptive element 436 is greater than the depth D of the hole 434 for each proprioceptive element 436 and hole 434 in which it is disposed, where both the height H and the depth D are measured from the bottom of the hole 434. In other embodiments, some of the holes may have depths greater than the heights of the proprioceptive elements that they surround, as illustrated with respect to FIG. 50

Figure 45:
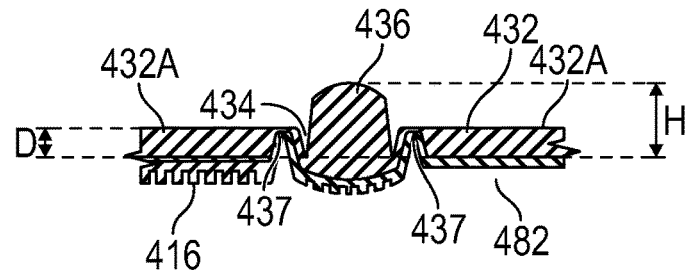
FIG. 45 is a cross-sectional view of the sole structure of FIG. 41 taken at lines 45-45 in FIG. 41.

The midsole body 432 also has annular recesses 437 in the distal surface 23, each annular recess 437 encircling a different one of the plurality of proprioceptive elements 436 from below, and aligned with one of the holes 434 in the proximal surface 22. Some of the annular recesses 437 are indicated in FIGS. 43 and 45. Each annular recesses 437 extends upward from the distal surface 23 beyond a lowest extent of the hole 434 that it surrounds.

The sole structure 410 includes an outsole 416 secured to the distal surface 23 of the midsole body 432 and lining the annular recesses 437 of the midsole body 43, as best shown in FIG. 43. The outsole 416 has a proximal surface 453 with annular protrusions 455 nested in the annular recesses 437 of the midsole body 432. The outsole also has annular recesses 457 at a distal surface 483. The annular recesses 437 underlie the annular protrusions 455 and encircle the annular recesses 434 from below. The outsole 416 is further secured to distal ends 38 of proprioceptive elements 436 (i.e., to a distal surface of each proprioceptive element 436).

Figure 42:
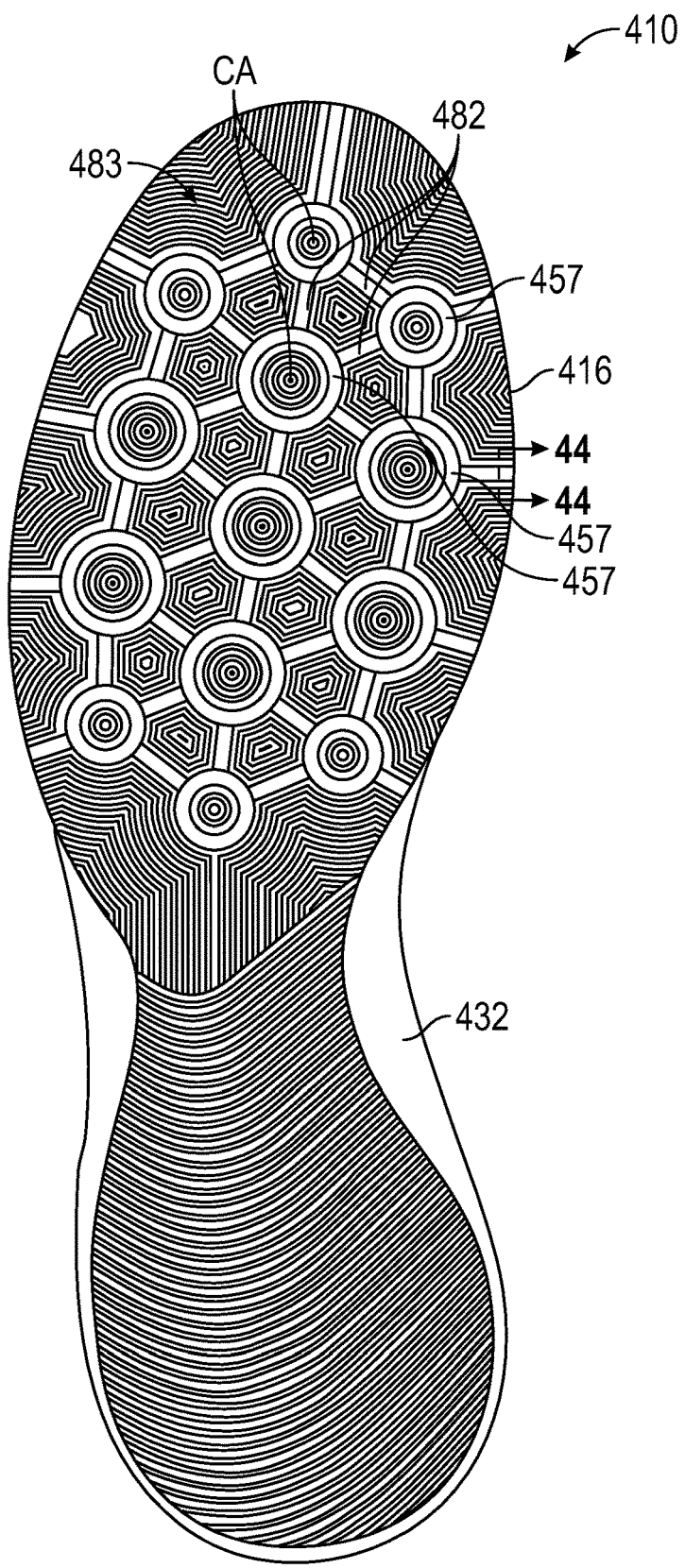
FIG. 42 is a bottom view of the sole structure of FIG. 41.

The outsole 416 has external flex grooves 482 at a distal surface 483 of the outsole 416 as best shown in FIG. 42. The external flex grooves 482 extend along lines connecting center axes CA of adjacent ones of the proprioceptive elements 436, as indicated in FIG. 42. Only some of the external flex grooves 482 are indicated in FIG. 42.

Figure 46:
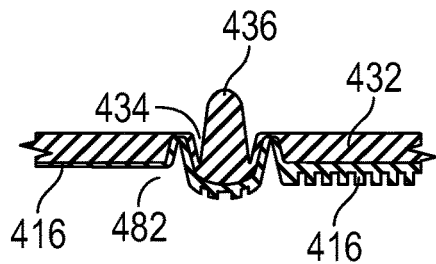
FIG. 46 is a cross-sectional view of the sole structure of FIG. 41 taken at lines 46-46 in FIG. 41.
Figure 47:
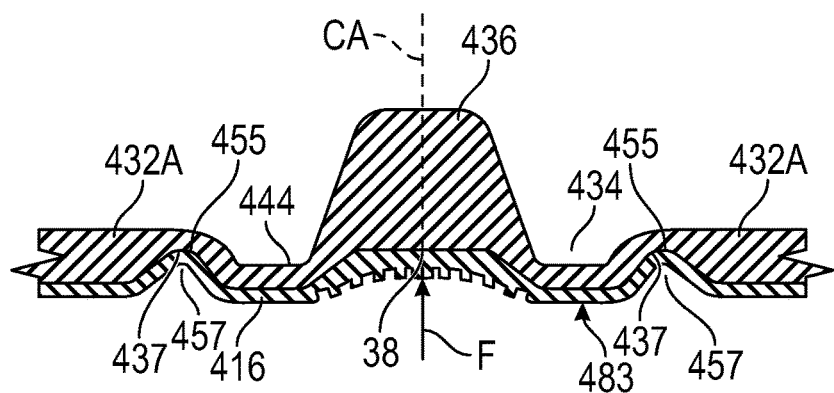
FIG. 47 is a cross-sectional view of the sole structure of FIG. 45 articulating at a proprioceptive element under a force along a central axis of the proprioceptive element.
Figure 48:
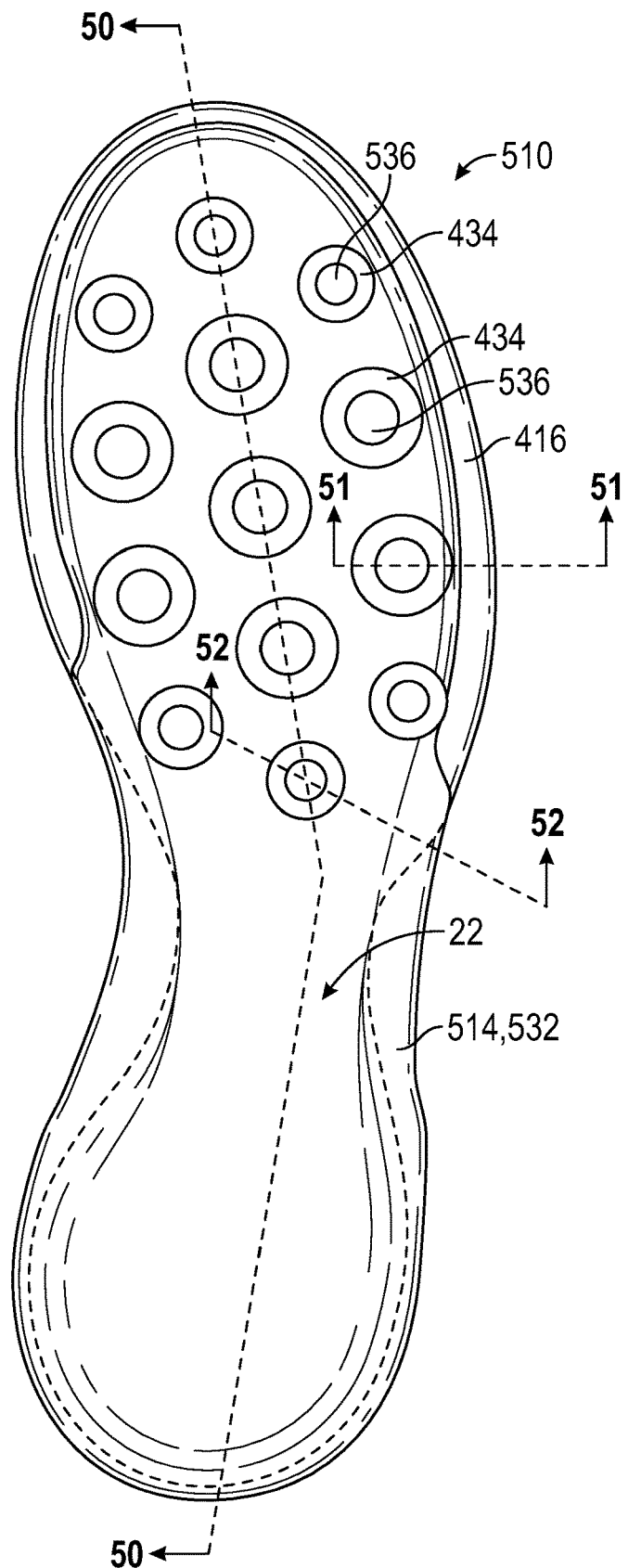
FIG. 48 is a plan view of an alternative embodiment of a sole structure for an article of footwear.
Figure 49:
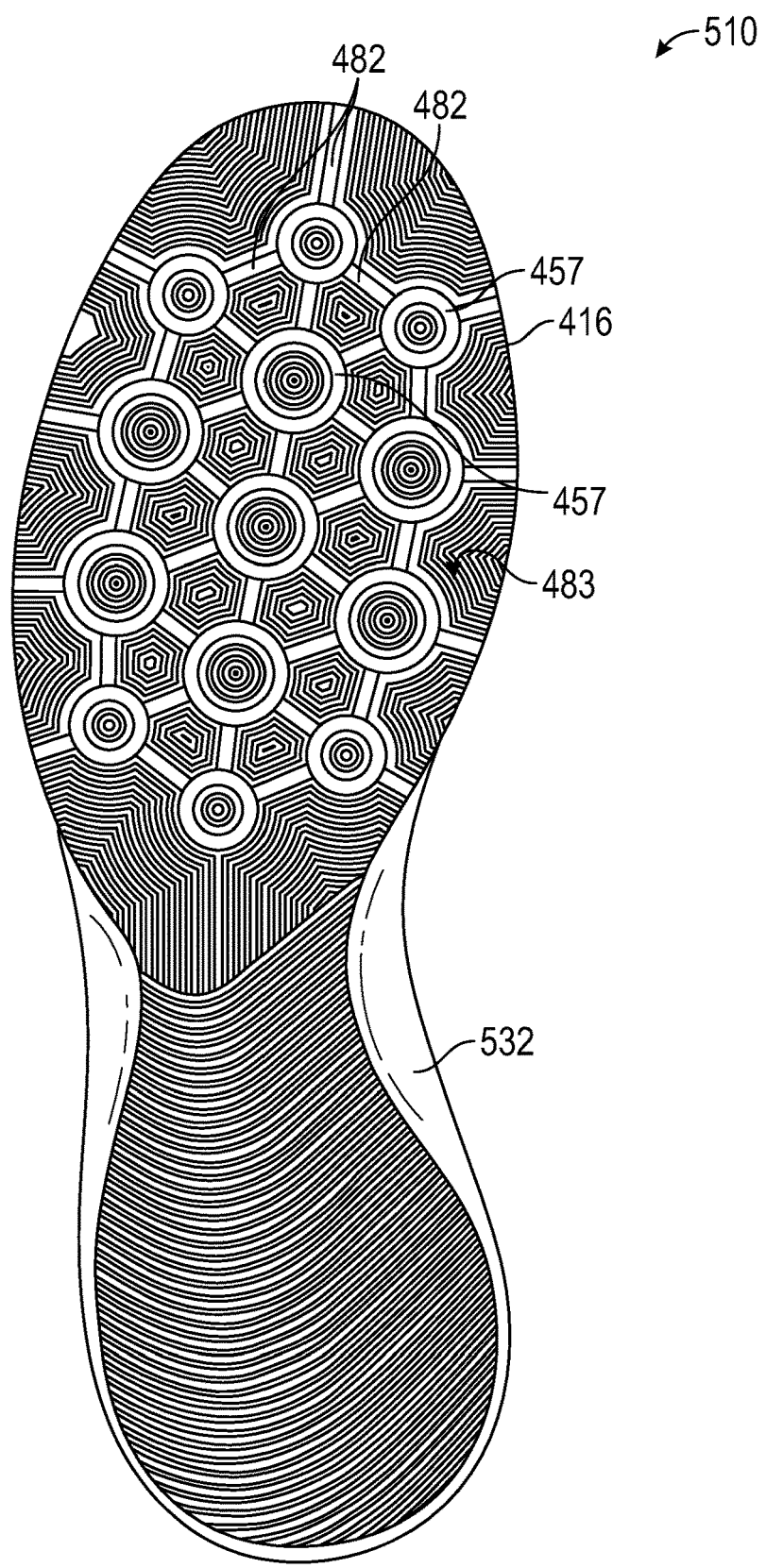
FIG. 49 is a bottom view of the sole structure of FIG. 48.
Figure 53:
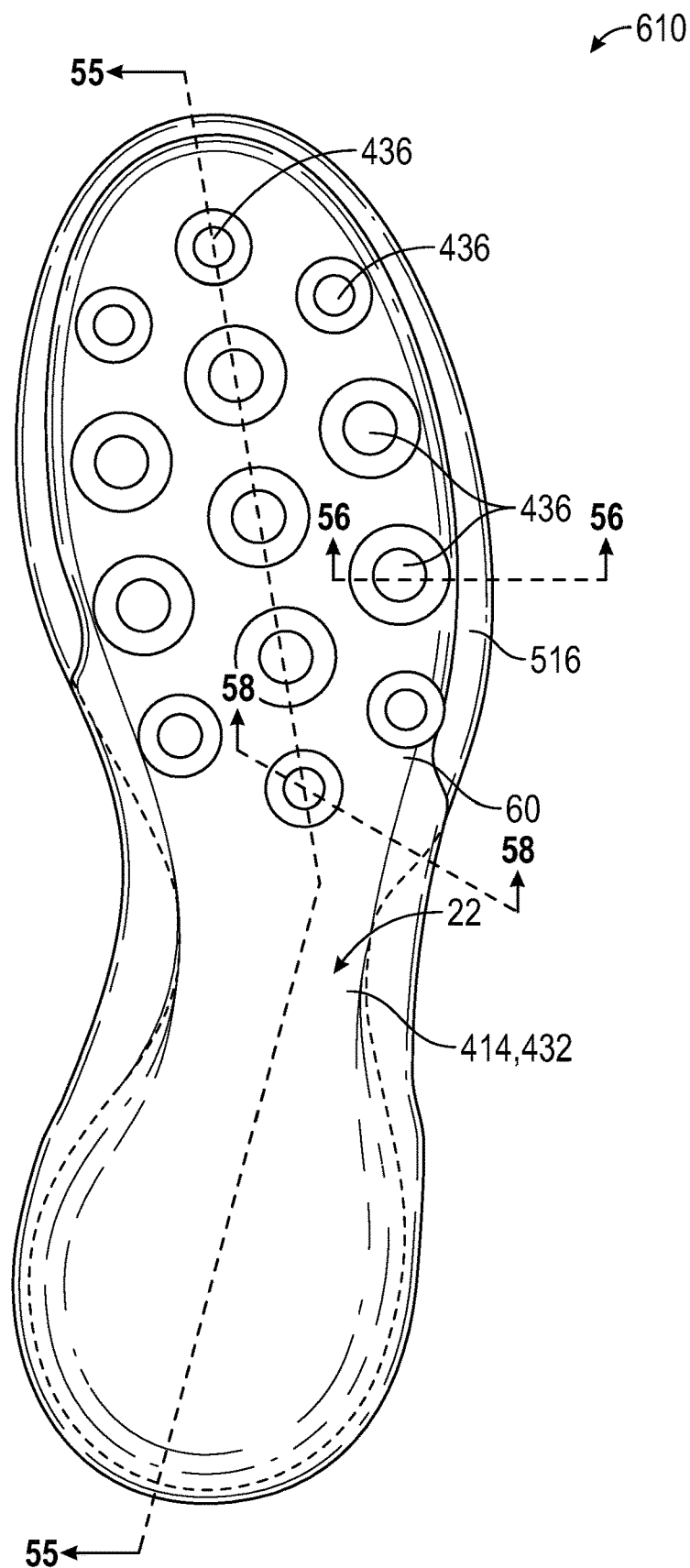
FIG. 53 is a plan view of an alternative embodiment of a sole structure for an article of footwear.
Figure 54:
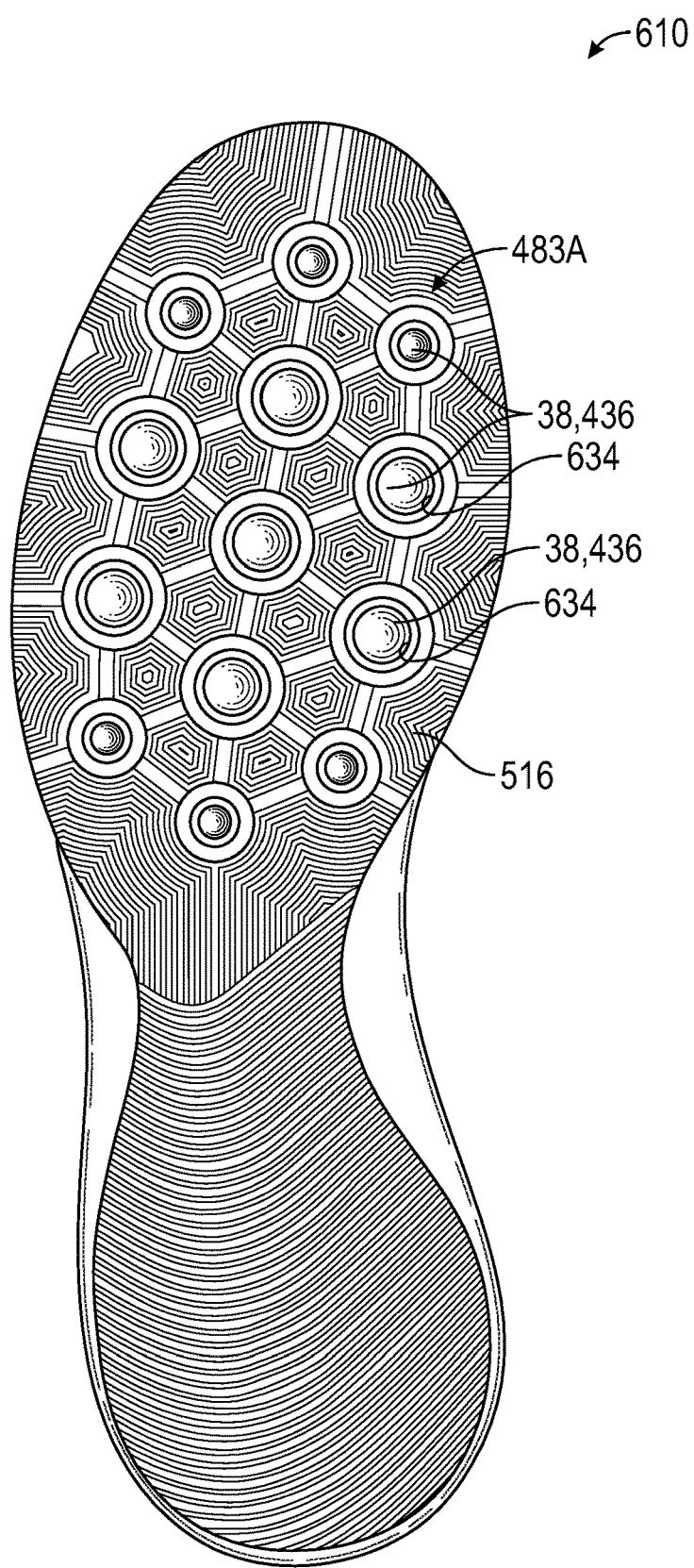
FIG. 54 is a bottom view of the sole structure of FIG. 53.

As illustrated by a comparison of FIG. 45 to FIG. 47, each proprioceptive element 436 is movable relative to adjacent portions 432A of the midsole body 432 along a central axis CA of the proprioceptive element 436 in a direction toward the proximal surface 22 when under a force toward the proximal surface 22 applied at a distal end 38 of the proprioceptive element along the central axis CA. As illustrated in FIG. 47, the annular recesses 437 of the midsole body 432 encircling the holes 434, and the protrusions 455 and annular recesses 457 of the outsole 416 enable the sole structure 410 to function as bellows between the proprioceptive element 436 and the portions 432A of the midsole body 432 surrounding the hole 434, articulating to simultaneously decrease the depths of the holes 434 and the annular recesses 457 while driving the proximal end 42 of the proprioceptive element 436 in the direction of the axial force, such as further toward a foot-receiving cavity and a foot therein to enhance proprioceptive feedback. The external grooves 482 further enable independent articulation of the sole structure 410 at adjacent proprioceptive elements 436, such that a distinction between active proprioceptive elements 436 and inactive proprioceptive elements 436 is more apparent to the wearer. The sole structure 410 can articulate both in dorsiflexion (e.g., along curve 85 in FIG. 43) and in plantarflexion (e.g., along curve 86 in FIG. 43) similar to sole structure 10A as described with respect to FIG. 20.

FIGS. 48-52 illustrate another embodiment of a sole structure 510 with a midsole 514 having a midsole body 532. The outsole 416 as described with respect to FIGS. 41-47 is secured to the midsole body 532 in the same manner as described with respect to midsole body 432. The sole structure 510 is identical in all respects to sole structure 410 except that proprioceptive elements 536 used in place of proprioceptive elements 436 have a height H1 that is less than the depth D of the hole 434 (i.e., the annular recess) in which it is disposed, where both the height H1 and the depth D are measured from the bottom of the hole 434. Stated differently, the proximal ends 42 of the proprioceptive elements 536 are recessed relative to the surrounding portion of the midsole body 532 at the proximal surface 22. In other embodiments, some of the holes 434 may have depths less than the heights of the proprioceptive elements that they surround. Because the proprioceptive elements 536 do not extend beyond (i.e., above) the proximal surface 22 in the unloaded position of FIG. 50, greater translation along their central axes can occur before pressure of an overlying foot inhibits further translation. Accordingly, the sole structure 510 can likewise experience greater articulation than sole structure 410.

FIGS. 53-60 illustrate another embodiment of a sole structure 610 with the midsole 414 having the midsole body 432 as described with respect to FIGS. 41-47. An outsole 516 is secured to the midsole body 432 in the same manner as described with respect to outsole 416, except that the outsole 516 has through-holes 634 that are aligned with and underlie the proprioceptive elements 436 such that the distal ends 38 of the proprioceptive elements 436 are exposed at the distal surface 483A of the outsole 516 and therefore serve as a portion of the distal surface of the sole structure 610. The sole structure 610 functions as described with respect to sole structure 410 except that, because the distal ends of the proprioceptive elements 436 are exposed, they may modify the traction of the sole structure 610 both with respect to the ground and with respect to an object such as a ball. For example, if the proprioceptive elements 436 are a material that is softer than the material of the outsole 416, they may increase the grip of the sole structure 610 on a ball.

Figure 59:
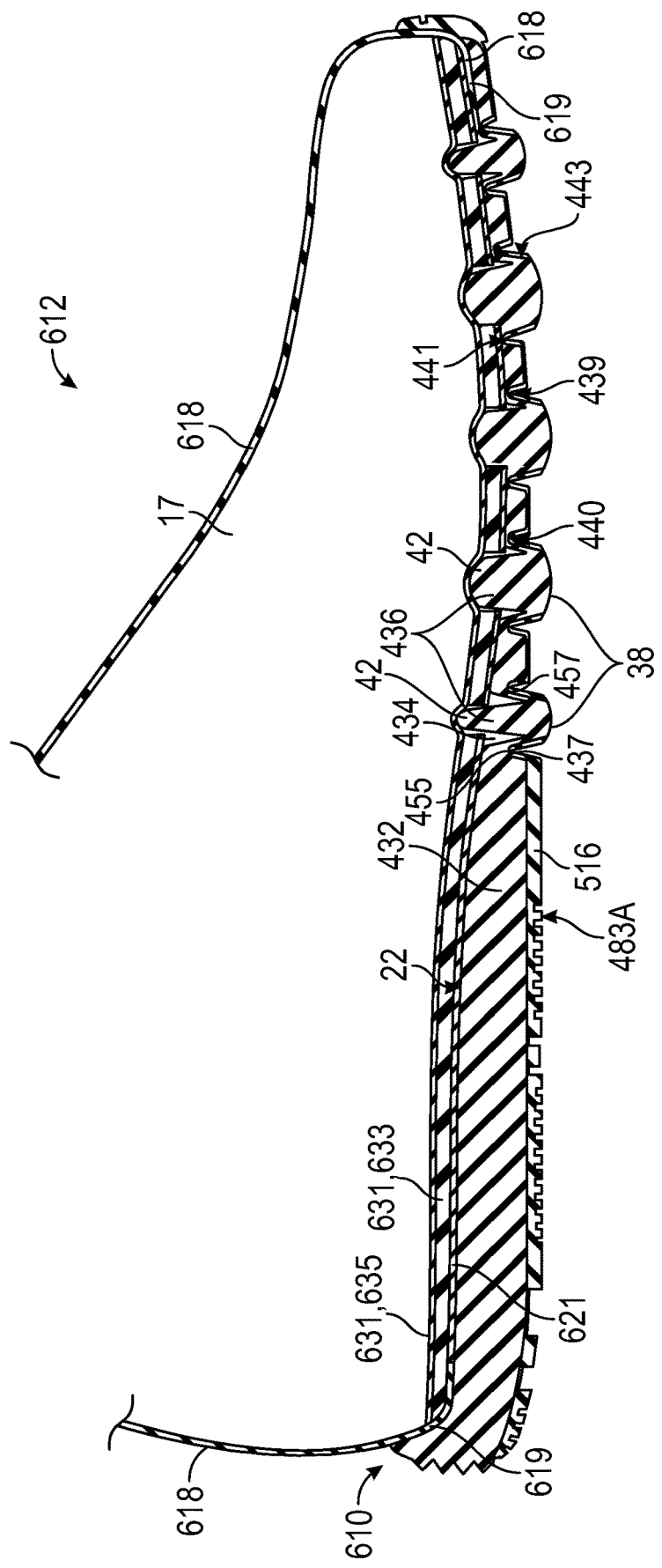
FIG. 59 is a cross-sectional and fragmentary view of an article of footwear including the sole structure of FIG. 55, an upper, and a sockliner.

FIGS. 59 and 60 show the sole structure 610 assembled in an article of footwear 612. The article of footwear 612 includes an upper 618 secured to the sole structure 610. The upper 618 may be any material or materials. The upper 618 terminates at a lower periphery 619 that is secured to a strobel 621. Both a portion of the lower periphery 619 and the strobel 621 are secured to the proximal surface 22 of the midsole body 432. The strobel 621 has holes 621A that are through-holes and are aligned with the proprioceptive elements 436 so that the proprioceptive elements 436 protrude through the holes 621A.

The article of footwear 612 also includes a sockliner 631 overlying the midsole body 432 and the strobel 621. More specifically, the sockliner 631 includes a foam layer 633 that has a distal surface 637 secured to a proximal surface 639 of the strobel 621. The sockliner 631 also includes an elastic layer 635 that has a distal surface 643 secured to a proximal surface 645 of the foam layer 633. The sockliner 631 is shown in plan view in FIG. 61. The elastic layer 635 is also referred to herein as an elastic sockliner top layer. The elastic layer 635 overlies the plurality of proprioceptive elements 436 such that proximal ends 42 of the proprioceptive elements contact the distal surface 643 of the elastic layer 635. The elastic layer 635 is thinner and has greater elastic stretchability than the foam layer 633. The midsole body 432 has a plurality of midsole recessed surface portions 439. The outsole 516 has a plurality of outsole protruded surface portions 441 and a plurality of outsole recessed surface portions 440. Each of the plurality of proprioceptive elements 436 has a side surface 443.

As shown in FIG. 60, the foam layer 633 is disposed between the elastic layer 635 and the midsole body 432. The foam layer 633 has holes 633A aligned with the proprioceptive elements 436 such that the proprioceptive elements 436 extend through the holes 633A of the foam layer 633 toward the elastic layer 635. Accordingly, the proprioceptive elements 436 extend through the holes 621A of the strobel 621 and through the holes 633A of the foam layer 633 when interfacing with the elastic layer 635. With only the thin, flexible elastic layer 635 between the foot-receiving cavity 17 and the proprioceptive elements 436, proprioception is enhanced.

Figure 62:
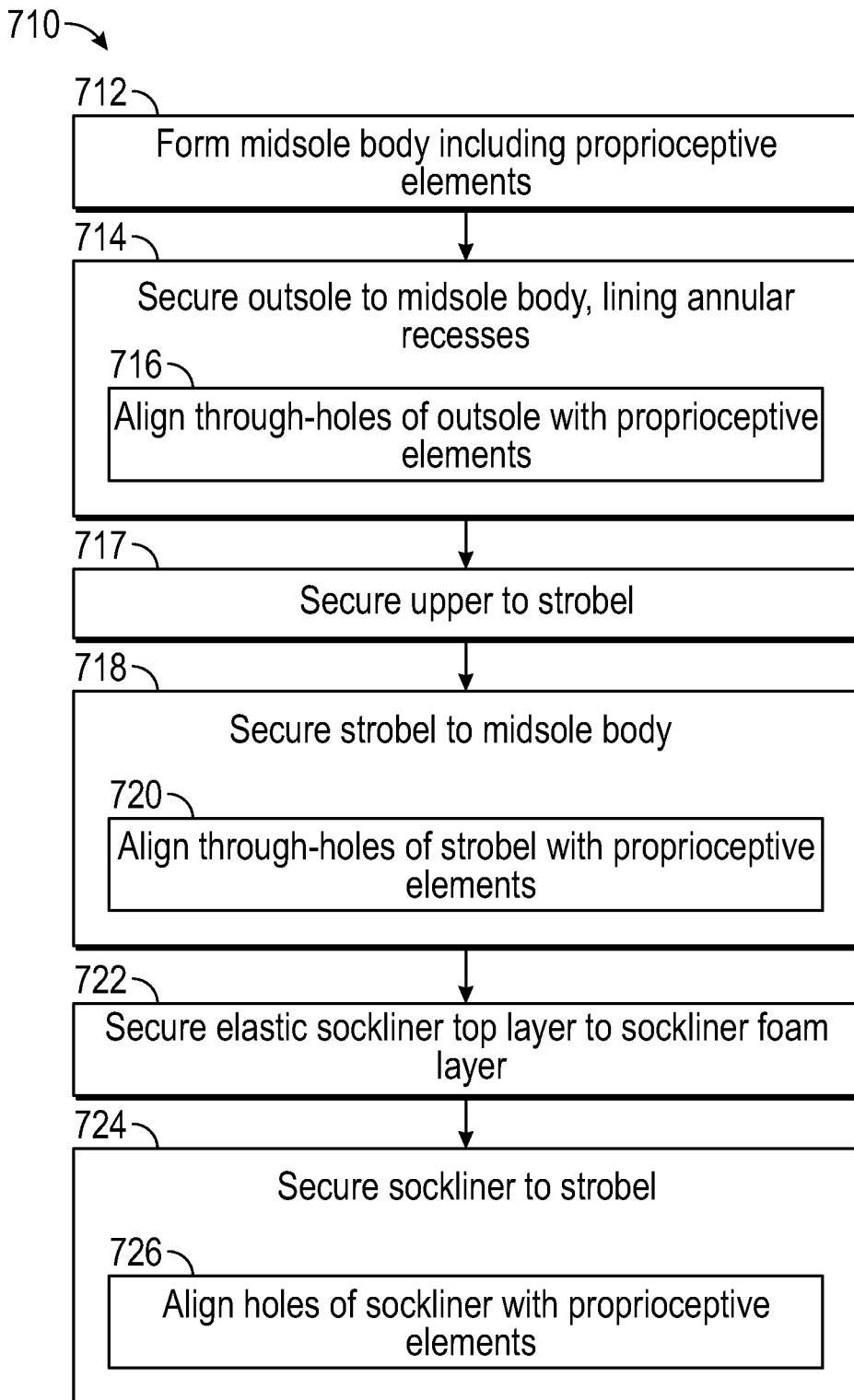
FIG. 62 is a flowchart of a method of manufacturing an article of footwear.

FIG. 62 is a flowchart of a method 710 of manufacturing an article of footwear, such as article of footwear 612. The method 710 may apply to footwear that includes any of the sole structures 410, 510, 610, with the exception of some portions of the method applicable only to sole structures 410 and 610. The method 710 begins with block 712, forming a midsole body such that the midsole body has annular holes at a proximal surface of the midsole body, and annular recesses in a distal surface of the midsole body, with each annular recess encircling a different one of the annular holes from below and extending beyond a lowest extent of the different one of the annular holes toward the proximal surface. The midsole body also has a plurality of proprioceptive elements, each proprioceptive element centered in a different one of the annular holes. Block 712 applies to the midsole bodies 432 and 532 as described herein. Forming the midsole body in block 712 may be by molding, such as compression molding, or by 3-D printing.

Next, the method 710 moves to block 714, securing an outsole to the distal surface of the midsole body so that the outsole lines the annular recesses of the midsole body. For example, outsole 416 or 516 may be used. If outsole 516 is used, block 714 may include block 716, aligning the through-holes 634 of the outsole with the proprioceptive elements 436 such that the proprioceptive elements are exposed at a distal surface 483A of the outsole, as described with respect to FIG. 55.

The method then proceeds to block 717, securing an upper to a strobel, and then to block 718, securing the strobel to the proximal surface of the midsole body. Blocks 717 and 718 may be carried out, for example with upper 618, strobel 621, and midsole body 432 as described with respect to FIGS. 59-60. The strobel 621 has through-holes 621A that align with the plurality of proprioceptive elements 436. Accordingly, block 718 includes block 720, aligning the through-holes 621A of the strobel 621 with the proprioceptive elements 436.

Next, the method moves to block 722, securing an elastic sockliner top layer 635 to a proximal surface of the foam layer 633, with the elastic sockliner top layer 635 spanning across the holes of the sockliner 631. For example, elastic layer 641 is secured to foam layer 633 of the sockliner 631 as described.

Next, the method moves to block 724, securing a sockliner to the proximal surface of the strobel. For example, sockliner foam layer 633 is secured to the strobel 621 in this manner. Additionally, block 724 may include block 726, aligning the holes 633A of the sockliner (i.e., holes 633A of sockliner foam layer 633) with the plurality of proprioceptive elements 436 such that the proprioceptive elements 436 protrude through the holes of the strobel 621 and the holes of the sockliner foam layer 633 when interfacing with the elastic sockliner top layer 635.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above", "below", "upward", "downward", "top", "bottom", etc., may be used descriptively relative to the figures, without representing limitations on the scope of the invention, as defined by the claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that would an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A sole structure for an article of footwear comprising:
a midsole body having a proximal surface and a distal surface;
wherein the midsole body has a first set of holes extending through the midsole body from the proximal surface to the distal surface, a second set of holes extending through the midsole body from the proximal surface to the distal surface, and a cleft extending partway through the midsole body between the first set of holes and the second set of holes; and
wherein center axes of holes of the first set are parallel with center axes of holes of the second set with the cleft open, and are nonparallel with the center axes of the holes of the second set with the cleft closed;
a plurality of proprioceptive elements, each proprioceptive element disposed in a different hole of the first set or of the second set, and translatable relative to the midsole body along a central axis of the respective hole in a direction toward the proximal surface under a force along the central axis at a distal end of the proprioceptive element; and
a connecting web integral with the plurality of proprioceptive elements at either proximal ends or distal ends of the plurality of proprioceptive elements such that the connecting web and the plurality of proprioceptive elements are a single, unitary component;
wherein:
the connecting web is integral with the plurality of proprioceptive elements at proximal ends of the plurality of proprioceptive elements; and
the connecting web lifts away from the midsole body with any ones of the plurality of proprioceptive elements that translate relative to the midsole body in a direction toward the proximal surface.

2. The sole structure of claim 1, wherein
the cleft is in the proximal surface and extends along a longitudinal axis of the midsole body;
the first set of holes is disposed between a medial periphery of the midsole body and the cleft;
the second set of holes is disposed between a lateral periphery of the midsole body and the cleft;
the center axes of the holes of the first set angle laterally outward from the proximal surface of the midsole body to the distal surface of the midsole body such that a distal end of each hole of the first set is nearer to the medial periphery than is a proximal end of the hole; and
the center axes of the holes of the second set angle laterally outward from the proximal surface of the midsole body to the distal surface of the midsole body such that a distal end of each hole of the second set is nearer to the lateral periphery than is a proximal end of the hole.

3. The sole structure of claim 1, wherein:
the midsole body is a polymeric foam and includes an interior portion, and a skin that covers the interior portion and extends along each hole of the first set and each hole of the second set from the proximal surface to the distal surface;
the skin has a first density; and
the interior portion has a second density less than the first density such that the midsole body has a greater compressive stiffness under a force of the midsole body along the center axis of each hole than transverse to the center axis, or than at an oblique angle to the center axis.

4. The sole structure of claim 3, wherein the interior portion is an open-cell polymeric foam.

5. The sole structure of claim 3, wherein the interior portion is a closed-cell polymeric foam.

6. The sole structure of claim 1, in combination with a sock overlying the connecting web such that the proximal ends of the plurality of proprioceptive elements translate into a foot-receiving cavity of the sock.

7. The sole structure of claim 1, further comprising:
an outsole integral with the plurality of proprioceptive elements at distal ends of the plurality of proprioceptive elements.

8. The sole structure of claim 1, wherein one or more of the plurality of proprioceptive elements is cylindrical or discoid.

9. The sole structure of claim 1, wherein the plurality of proprioceptive elements include silicone proprioceptive elements disposed in at least one of the first set of holes or the second set of holes at a heel region of the midsole body.

10. The sole structure of claim 1, wherein the first set of holes and the second set of holes are disposed in one or both of a bottom portion or a sidewall portion of the midsole body, and in at least one of a forefoot region, a midfoot region, or a heel region of the midsole body.

11. The sole structure of claim 1, wherein one or more holes of the first set of holes may have different diameters than one or more other holes of the first set of holes, one or more holes of the second set may have different diameters than one or more other holes of the second set of holes, or one or more holes of the first set may have different diameters than one or more holes of the second set.

12. The sole structure of claim 1, further comprising:
an outsole secured to the distal surface of the midsole body.

13. A method of manufacturing a sole structure for an article of footwear, the method comprising:
extending a first set of pins into a mold cavity on a first side of a protrusion, and a second set of pins into the mold cavity on a second side of the protrusion; wherein pins of the first set of pins are parallel with pins of the second set of pins;

disposing polymeric material into a mold cavity of a mold for a midsole body; wherein the mold has a mold surface with a protrusion;

molding the polymeric material to the shape of the mold surface, thereby forming a midsole body, the first set of pins forming a first set of holes in the midsole body, the second set of pins forming a second set of holes in the midsole body, and the protrusion forming a cleft between the first set of holes and the second set of holes;

wherein the midsole body has a proximal surface and a distal surface;

wherein the first set of holes extend through the midsole body from the proximal surface to the distal surface, the second set of holes extend through the midsole body from the proximal surface to the distal surface, and the cleft extends partway through the midsole body between the first set of holes and the second set of holes;

withdrawing the first set of pins and the second set of pins from the midsole body; and removing the midsole body from the mold; and wherein center axes of the holes of the first set of holes are parallel with center axes of holes of the second set of holes with the cleft open;

wherein center axes of the holes of the first set of holes are nonparallel with center axes of the holes of the second set of holes when the cleft is closed;

wherein the sole structure further includes:
- a plurality of proprioceptive elements, each proprioceptive element disposed in a different hole of the first set of holes or of the second set of holes, and translatable relative to the midsole body along a central axis of the respective hole in a direction toward the proximal surface under a force along the central axis at a distal end of the proprioceptive element; and
- a connecting web integral with the plurality of proprioceptive elements at either proximal ends or distal ends of the plurality of proprioceptive elements such that the connecting web and the plurality of proprioceptive elements are a single, unitary component;

wherein:
the connecting web is integral with the plurality of proprioceptive elements at proximal ends of the plurality of proprioceptive elements; and
the connecting web lifts away from the midsole body with any ones of the plurality of proprioceptive elements that translate relative to the midsole body in a direction toward the proximal surface.

14. The method of claim 13, further comprising:
disposing a first plurality of proprioceptive elements in at least some holes of the first set of holes, and a second plurality of proprioceptive elements in at least some holes of the second set of holes such that any of the first plurality and the second plurality of proprioceptive elements translate relative to the midsole body in a direction toward the proximal surface under a force along central axes of the proprioceptive elements at distal ends.

15. The method of claim 13, wherein a first plurality of proprioceptive elements have a first density, and a second plurality of proprioceptive elements have a second density different than the first density.

16. The method of claim 13, wherein:
the connecting web is integral with a first plurality of proprioceptive elements and with a second plurality of proprioceptive elements at proximal ends of the first plurality and the second plurality; and
said disposing includes positioning the connecting web over the proximal surface of the midsole body such that the first plurality of proprioceptive elements and the second plurality of proprioceptive elements are aligned with respective holes of the first set and the second set, and inserting the first plurality of proprioceptive elements and the second plurality of proprioceptive elements simultaneously.

17. The method of claim 13, further comprising:
securing an outsole to the distal surface of the midsole body, with the outsole spanning across the first set of holes and the second set of holes and across distal ends of a first plurality of proprioceptive elements and a second plurality of proprioceptive elements.

18. The method of any of claim 13, further comprising:
securing an inner sock to the proximal surface of the midsole body; and
securing an outer sock to the distal surface of the midsole body such that the midsole body is disposed inside of the outer sock, and between the inner sock and the outer sock.

* * * * *